US011728938B2

(12) United States Patent
Nunome et al.

(10) Patent No.: US 11,728,938 B2
(45) Date of Patent: Aug. 15, 2023

(54) TERMINAL AND COMMUNICATION METHOD

(71) Applicant: Panasonic Intellectual Property Corporation of America, Torrance, CA (US)

(72) Inventors: Tomoya Nunome, Ishikawa (JP); Ayako Horiuchi, Kanagawa (JP); Takashi Iwai, Ishikawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 25 days.

(21) Appl. No.: 16/618,608

(22) PCT Filed: May 7, 2018

(86) PCT No.: PCT/JP2018/017580
§ 371 (c)(1),
(2) Date: Dec. 2, 2019

(87) PCT Pub. No.: WO2019/003635
PCT Pub. Date: Jan. 3, 2019

(65) Prior Publication Data
US 2020/0186301 A1    Jun. 11, 2020

(30) Foreign Application Priority Data
Jun. 26, 2017 (JP) .................................. 2017-124261

(51) Int. Cl.
*H04L 1/18* (2023.01)
*H04L 1/1829* (2023.01)
(Continued)

(52) U.S. Cl.
CPC ......... *H04L 1/1861* (2013.01); *H04W 72/044* (2013.01); *H04W 72/23* (2023.01)

(58) Field of Classification Search
CPC ... H04L 1/1861; H04L 1/1621; H04L 1/1864; H04W 72/042; H04W 72/044
See application file for complete search history.

(56) References Cited

U.S. PATENT DOCUMENTS

2017/0142695 A1* 5/2017 Chen .................. H04W 72/21
2018/0159665 A1* 6/2018 Yang .................. H04W 72/12
(Continued)

FOREIGN PATENT DOCUMENTS

JP   2020-504497 A   2/2020
WO   2018/174634 A1  9/2018

OTHER PUBLICATIONS

International Search Report of PCT application No. PCT/JP2018/017580 dated Jun. 12, 2018.
(Continued)

*Primary Examiner* — John D Blanton
(74) *Attorney, Agent, or Firm* — Seed IP Law Group LLP

(57) ABSTRACT

In a terminal, based on a first parameter included in each of a plurality of downlink control signals, the first parameter indicating a cumulative count of code block groups (CBGs) configuring each of a plurality of transport blocks (TBs) assigned by the plurality of downlink control signals, a HARQ-ACK generation unit generates a response signal (HARQ-ACK) for each of the code block groups. A transmission unit collectively transmits the response signals for each of the code block groups.

4 Claims, 12 Drawing Sheets

(51) Int. Cl.
*H04W 72/044* (2023.01)
*H04W 72/23* (2023.01)

(56) References Cited

U.S. PATENT DOCUMENTS

2019/0215128 A1* 7/2019 Zhang .................. H04L 1/16
2020/0059327 A1* 2/2020 Kini ................. H04L 1/1812
2020/0100139 A1   3/2020 Kim et al.

OTHER PUBLICATIONS

3GPP TS 36.213 V14.2.0, "3rd Generation Partnership Project; Technical Specification Group Radio Access Network; Evolved Universal Terrestrial Radio Access (E-UTRA); Physical layer procedures (Release 14)", Mar. 2017.
RP-161596, "Revision of SI: Study on New Radio Access Technology", 3GPP TSG RAN Meeting #73, Sep. 2016.
R1-1706964, "Discussion on CBG-based feedback", 3GPP TSG RAN WG1 Meeting #89, May 2017.
R1-1710169, "Discussion on HARQ-ACK feedback for CBG-based transmission", 3GPP TSG RAN WG1 NR Ad-Hoc#2, Jun. 2017.
R1-1710727, "HARQ-ACK Feedback for CBG-Based Retransmissions", 3GPP TSG RAN WG1 NR Ad-Hoc#2, Jun. 2017.
R1-1711114, "UL control signalling for CBG-based (re)transmission", 3GPP TSG RAN WG1 NR Ad-Hoc#2, Jun. 2017.
Fujitsu, Discussion on HARQ-ACK codebook [online], 3GPP TSG RAN WG1 adhoc_NR_AH_1706 R1-1710242, Internet<URL:http://www.3gpp.org/ftp/tsg_ran/WG1_RL1/TSGR1_AH/NR_AH_1706/Docs/R1-1710242.zip> Jun. 16, 2017, 5 pages.

* cited by examiner

FIG. 13

| INDEX OF WHICH NOTIFICATION IS PROVIDED | NUMBER OF HARQ-ACK BITS PER DL ASSIGNMENT |
|---|---|
| 0 | 2 |
| 1 | 4 |
| 2 | 6 |
| 3 | 8 |

TERMINAL AND COMMUNICATION METHOD

TECHNICAL FIELD

The present disclosure relates to terminals and communication methods.

BACKGROUND ART

A communication system called fifth-generation mobile communication system (5G) has been studied. In 5G, an increase in communication traffic, an increase in the number of connecting terminals, high reliability, low latency, and so forth are required for various use cases. Flexibly providing functions for each various use cases has been studied. As typical use cases, there are three cases, that is, enhanced mobile broadband (eMBB), large-scale communications/multiple connections (mMTC: massive machine type communications), and ultra reliable and low latency communications (URLLC). In 3GPP (3rd Generation Partnership Project), sophistication of the communication system has been studied from both aspects of sophistication of the LTE system and New RAT (Radio Access Technology) (for example, refer to NPL 1).

In LTE, in HARQ (hybrid automatic repeat request) for downlink (DL) data, retransmission control is performed for each transport block (TB). That is, when a base station (this may be referred to as eNB) transmits DL data to a terminal (which may be referred to as UE (user equipment)), the terminal generates a HARQ-ACK bit (response signal) of 1 bit for 1 TB for transmission to the base station. In TDD (time division duplex) or the like, the terminal may generate a HARQ-ACK bit of 1 bit for every plurality of TBs.

CITATION LIST

Non Patent Literature

NPL 1: RP-161596, "Revision of SI: Study on New Radio Access Technology", NTT DOCOMO, September 2016

NPL 2: 3GPP TS 36.213 V14.2.0, "Physical layer procedures (Release 14)", 2017-03

SUMMARY OF INVENTION

In New RAT, retransmission control for each code block group (CBG) has been studied. A CBG is acquired by grouping one or more code blocks (CBs), and a TB is configured of one or more CBGs. However, retransmission control methods for each CBG in New RAT have not been sufficiently studied.

One embodiment of the present disclosure facilitates providing a terminal and communication method capable of appropriately performing retransmission control for each CBG.

A terminal according to one embodiment of the present disclosure includes: a circuit which generates, based on a first parameter included in each of a plurality of downlink control signals, the first parameter indicating a cumulative count of code block groups configuring each of a plurality of transport blocks assigned by the plurality of downlink control signals, a response signal for each of the code block groups; and a transmitter which collectively transmits the response signals for each of the code block groups.

A terminal according to one embodiment of the present disclosure includes: a circuit which generates, based on a first parameter included in each of a plurality of downlink control signals, the first parameter indicating a cumulative count of transmissions of the plurality of downlink control signals, a response signal for each of the code block groups configuring each of a plurality of transport blocks assigned by the plurality of downlink control signals; and a transmitter which collectively transmits the response signals for each of the code block groups. The number of bits of the response signals corresponding to the respective transport blocks assigned by one of the downlink control signals is a fixed value.

A terminal according to one embodiment of the present disclosure includes: a circuit which generates, based on a first parameter included in each of a plurality of downlink control signals, the first parameter indicating a cumulative count of transmissions of the plurality of downlink control signals, a first response signal for each of the plurality of downlink control signals and a second response signal for each of code block groups configuring each of the plurality of transport blocks assigned by the plurality of downlink control signals; and a transmitter which transmits the first response signal and the second response signal.

A communication method according to one embodiment of the present disclosure includes: generating, based on a first parameter included in each of a plurality of downlink control signals, the first parameter indicating a cumulative count of code block groups configuring each of a plurality of transport blocks assigned by the plurality of downlink control signals, a response signal for each of the code block groups; and collectively transmitting the response signals for each of the code block groups.

A communication method according to one embodiment of the present disclosure includes: generating, based on a first parameter included in each of a plurality of downlink control signals, the first parameter indicating a cumulative count of transmissions of the plurality of downlink control signals, a response signal for each of code block groups configuring each of a plurality of transport blocks assigned by the plurality of downlink control signals; and collectively transmitting the response signals for each of the code block groups. The number of bits of the response signals corresponding to the respective transport blocks assigned by one of the downlink control signals is a fixed value.

A communication method according to one embodiment of the present disclosure includes: generating, based on a first parameter included in each of a plurality of downlink control signals, the first parameter indicating a cumulative count of transmissions of the plurality of downlink control signals, a first response signal for each of the plurality of downlink control signals and a second response signal for each of code block groups configuring each of the plurality of transport blocks assigned by the plurality of downlink control signals; and transmitting the first response signal and the second response signal.

Note that comprehensive or specific embodiments of these may be implemented as a system, device, method, integrated circuit, computer program, or recording medium or may be implemented in any combination of a system, device, method, integrated circuit, computer program, and recording medium.

According to one embodiment of the present disclosure, retransmission control for each CBG can be appropriately performed.

Additional advantages and effects in one embodiment of the present disclosure will become apparent from the specification and the drawings. While these advantages and/or effects are each provided by several embodiments and features described in the specification and the drawings, all are not necessarily required to be provided in order to obtain one or more identical features.

BRIEF DESCRIPTION OF DRAWINGS

FIG. 13 illustrates one example of a pattern of the number of HARQ-ACK bits per DL assignment according to a generation method 2-2.

DESCRIPTION OF EMBODIMENTS

In the following, an embodiment of the present disclosure is described in detail with reference to the drawings.

When a base station (which may be referred to as gNB in 5G) transmits DCI (downlink control information) for transmission of DL data but a terminal cannot receive DCI due to a decoding error (hereinafter referred to as a "DCI decoding error"), the terminal does not recognize the presence of DL data to the own terminal. In this case, when the terminal performs one HARQ-ACK transmission for one DCI reception, the terminal does not transmit HARQ-ACK. By recognizing that the terminal does not transmit HARQ-ACK, the base station can recognize that a DCI decoding error has occurred at the terminal.

On the other hand, when the terminal performs one HARQ-ACK transmission for a plurality of DCI receptions, even if a DCI decoding error has occurred to certain DL data, the terminal transmits a HARQ-ACK bit series generated based on the result of reception of DL data other than the error-occurring DL data to the base station. In this case, there is a possibility that the reception state at the terminal is not correctly transmitted to the base station due to the DCI decoding error. The base station and the terminal recognize different numbers of bits of the generated HARQ-ACK bit series, or notification of ACK is provided, which should originally be notification of DTX or NACK.

Thus, in LTE, as control information for allowing the terminal to identify that a DCI decoding error has occurred, a DAI (downlink assignment index) is used. The DAI is used when the terminal collectively transmits a plurality of HARQ-ACKs. Cases in which the terminal collectively transmits a plurality of HARQ-ACKs are when TDD is applied, when CA (carrier aggregation) is applied, and so forth.

In the following, HARQ-ACK transmission processes when TDD is applied and when CA is applied are described.

[HARQ-ACK Transmission When TDD is Applied]

One method of collectively transmitting a plurality of HARQ-ACKs in LTE TDD is "HARQ-ACK multiplexing". HARQ-ACK multiplexing is a scheme in which the terminal transmits HARQ-ACK of 1 bit for DL data reception of one subframe. For example, in HARQ-ACK multiplexing when the terminal transmits HARQ-ACK on a PUSCH (physical uplink shared channel), the arrangement of the HARQ-ACK bit series is determined by a DAI included in DL assignment (downlink assignment signal), and a HARQ-ACK codebook size (a total number of bits in one HARQ-ACK transmission) is determined by a DAI included in UL grant (uplink assignment signal).

Figure 1:
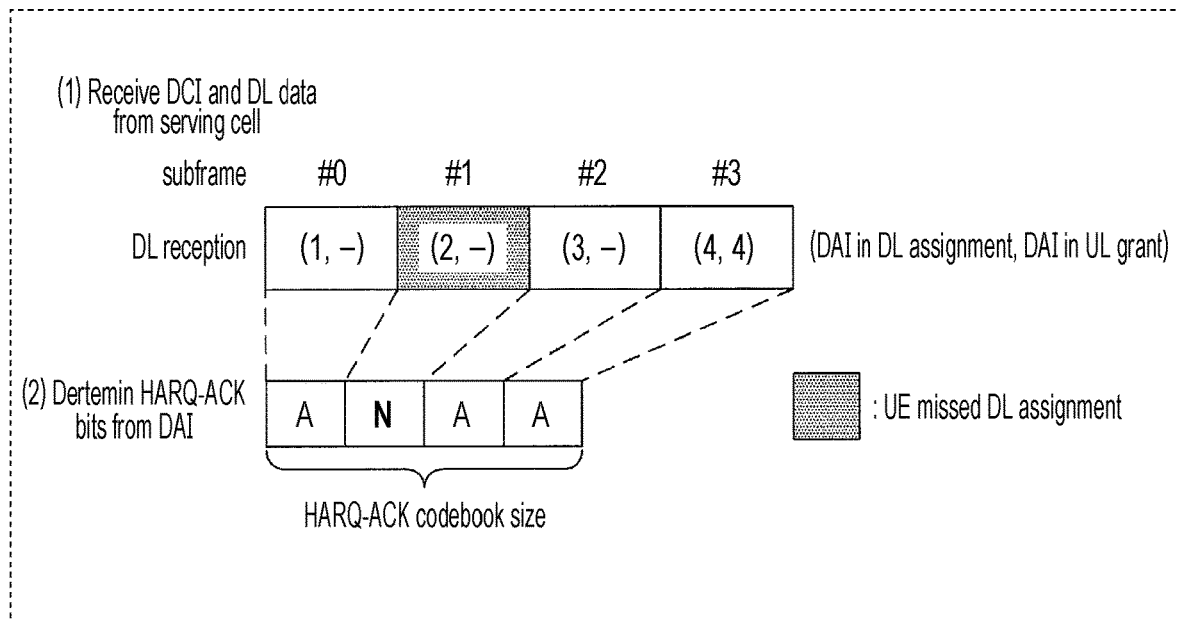
FIG. 1 illustrates one example of HARQ-ACK transmission process when TDD is applied.

FIG. 1 illustrates a use example of DAIs in TDD HARQ-ACK multiplexing. As illustrated in FIG. 1, when receiving DCI and DL data from a base station (serving cell) (at the time of DL reception), the terminal receives (DAI in DL assignment, DAI in UL grant) in each subframe. As described above, the DAI in DL assignment and the DAI in UL grant respectively indicate the following details in HARQ-ACK multiplexing.

DAI in DL assignment: an index of the HARQ-ACK bit series

DAI in UL grant: a HARQ-ACK codebook size of the HARQ-ACK bit series

Based on the DAI in DL assignment and the DAI in UL grant, the terminal determines a HARQ-ACK bit. For example, in FIG. 1, a DCI decoding error has occurred in a subframe #1. On the other hand, the terminal receives DAIs in DL assignment in subframes #0, #2, and #3 (indexes of the HARQ-ACK series: 1, 3, and 4), and receives a DAI in UL grant in the subframe #3 (a HARQ-ACK codebook size of the HARQ-ACK series: 4). Thus, the terminal identifies that a DCI decoding error has occurred in the subframe #1, and generates NACK as HARQ-ACK in the subframe #1. This allows the terminal to correctly transmit the reception state at the own terminal to the base station.

[HARQ-ACK Transmission When CA is Applied]

In eCA (enhanced CA) in Release 13, a scheme is adopted in which the arrangement of the HARQ-ACK bit series and the HARQ-ACK codebook size are determined by a "counter DAI" and a "total DAI". Here, a range of collective transmission of HARQ-ACK is represented as a "bundling window".

The above counter DAI and total DAI respectively indicate the following details.

counter DAI: a cumulative count of PDSCH transmissions (DL assignment transmissions) in the bundling window total DAI: a total number of PDSCH transmissions (DL assignment transmissions) in the bundling window In LTE, each of the counter DAI and the total DAI is represented by 2 bits, but numbers equal to 4 or larger can also be counted. This is based on the fact that the possibility that DCI reception at the terminal fails successively four times is sufficiently low.

Figure 2:
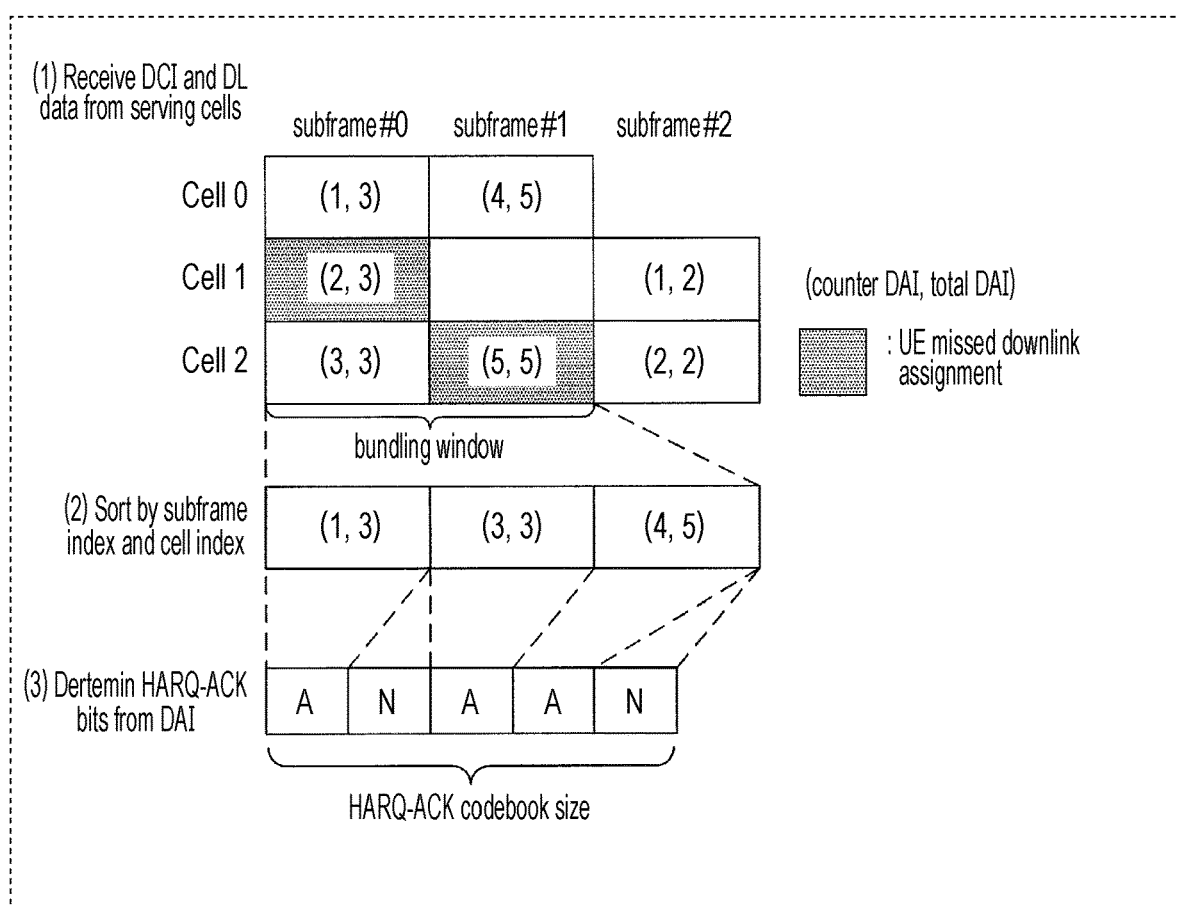
FIG. 2 illustrates one example of HARQ-ACK transmission process when CA is applied.

FIG. 2 illustrates a use example of DAIs in Release 13 eCA. In FIG. 2, by way of example, CA by three cells (cells 0, 1, and 2) is applied to the terminal.

As illustrated in FIG. 2, when receiving DCI and DL data from the base station (serving cell) (at the time of DL reception), the terminal receives (counter DAI, total DAI) in each cell in each subframe.

Based on the counter DAI and the total DAI, the terminal determines a HARQ-ACK bit. For example, in FIG. 2, a DCI decoding error has occurred in the cell 1 of the subframe #0 and the cell 2 of the subframe #1. On the other hand, having normally received DAIs in the other resources (the cells 0 and 2 of the subframe #0 and the cell 0 of the subframe #1) in the bundling window, the terminal can recognize that the total number of PDSCH transmissions (DL assignment transmissions) in the bundling window is five and the first, third, and fourth PDSCH transmissions have been received by the own terminal. That is, the terminal identifies that one DCI decoding error has occurred in each of the subframe #0 and the subframe #1, and generates NACK as HARQ-ACK for the second and fifth PDSCH transmissions. This allows the terminal to correctly transmit the reception state at the own terminal to the base station.

Note that the counter DAI/total DAI each indicate a value of 2 bits ($V^{DL}_{C-DAI,c,k}$ and $V^{DLI}_{C-DAI,c}$ in FDD, and $V^{DL}_{C-DAI,c,k}$ and $V^{DL}_{T-DAI,k}$ in TDD) in NPL 2 but here, are assumed to respectively indicate a cumulative count and a total number of DL assignment transmissions, for convenience of description. Also, values for actual signaling regarding the counter DAI/total DAI are values of the remainder (modulo 4) acquired by dividing the cumulative count and the total number by 4 but, in the following, are described as a cumulative count and a total number for the sake of brevity.

In the above, the examples of HARQ-ACK transmission when LTE TDD is applied and when CA is applied have been described.

In New RAT, as described above, it has been studied that the terminal transmits HARQ-ACK for each CBG. It has also been studied that the number of CBGs to be transmitted to the terminal is dynamically changed by using a DCI (downlink control signal). Methods of transmitting a HARQ-ACK bit series for each CBG in this HARQ-ACK transmission for each CBG (at the time of CBG-base transmission) have not been sufficiently studied.

Figure 3:
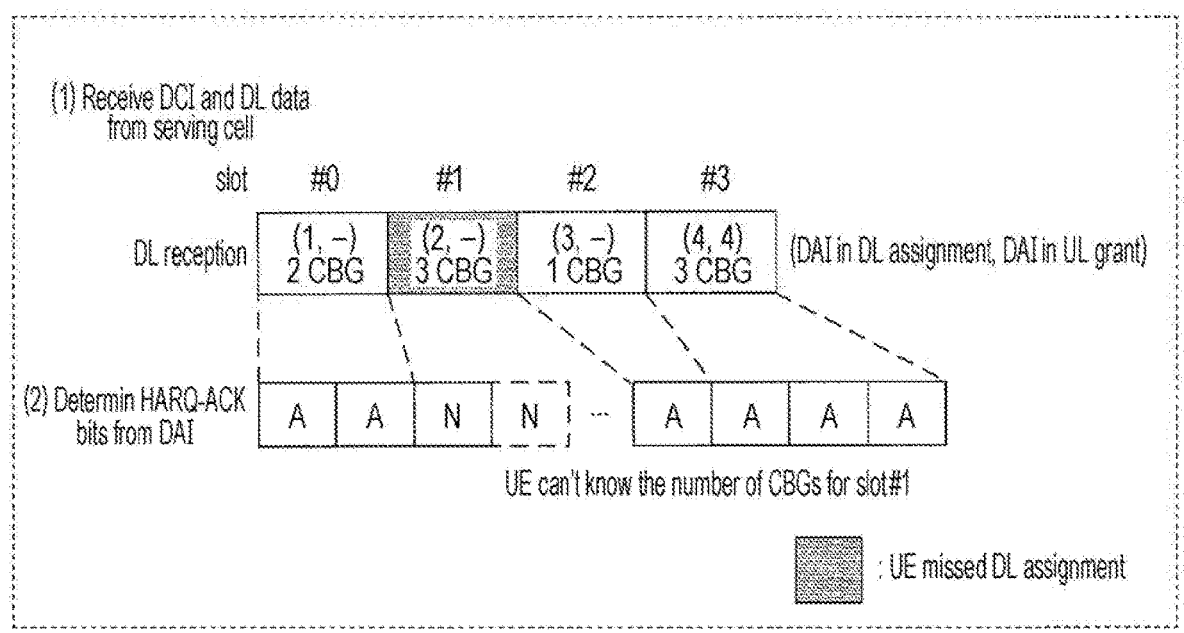
FIG. 3 illustrates one example of HARQ-ACK CBG-base transmission when TDD is applied.
Figure 4:
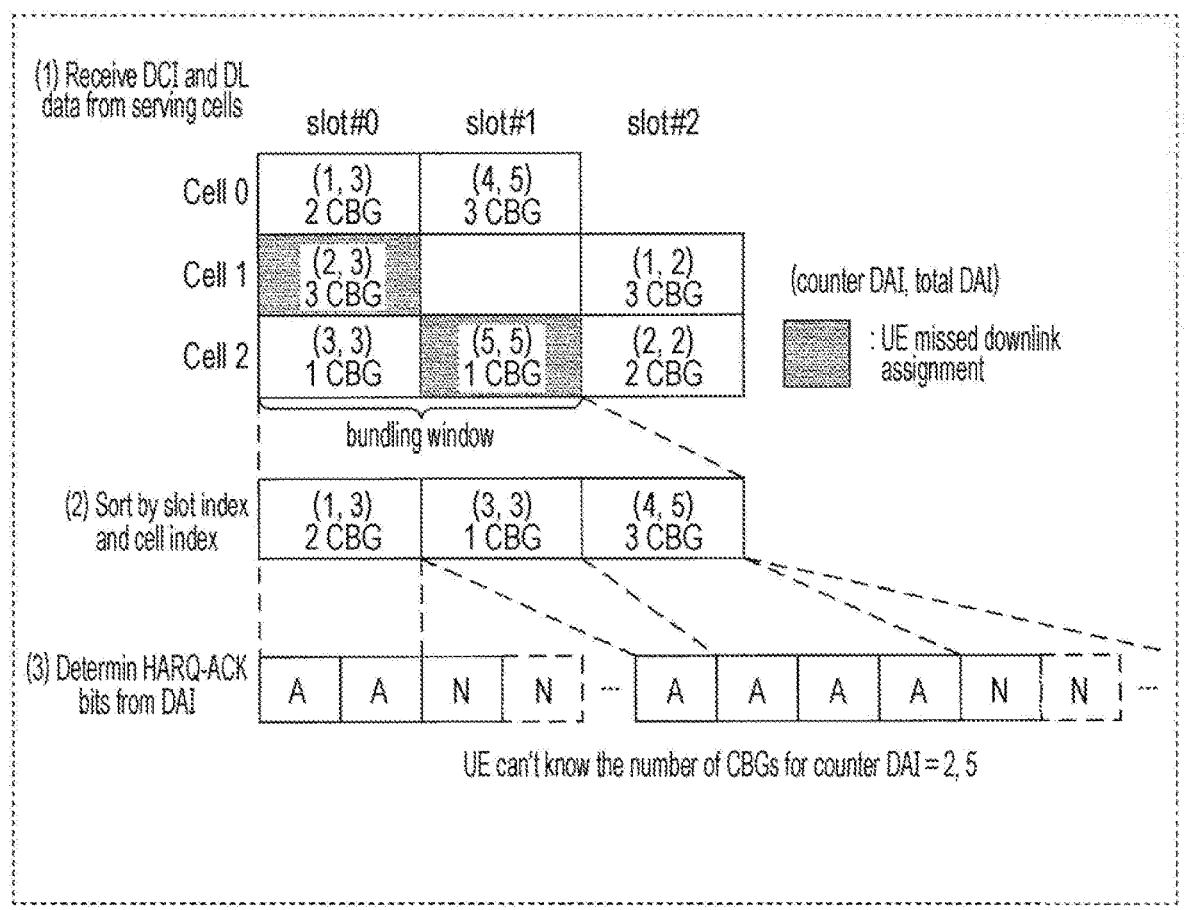
FIG. 4 illustrates one example of HARQ-ACK CBG-base transmission when CA is applied.

FIG. 3 and FIG. 4 are diagrams for description of a problem occurring when, by way of example, CBG-base transmission is performed when TDD is applied and when CA is applied.

As illustrated in FIG. 3, the number of CBGs is changed for each time resource (here, slot) in which DCI (DL assignment) is transmitted when TDD is applied. Also in FIG. 3, a DCI decoding error has occurred in a slot #1. In this case, in FIG. 3, as with the operation of FIG. 1, the terminal can identify that a DCI decoding error has occurred in the slot #1 based on the result of reception in a slot #0 and a slot #2. However, not having normally received DCI in the slot #1, the terminal cannot identify the number of CBGs in the slot #1, and cannot identify a HARQ-ACK (NACK) count for the slot #1.

Similarly, as illustrated in FIG. 4, the number of CBGs is changed for each cell and for each time resource (here, slot) in which DCI (DL assignment) is transmitted when CA is applied. Also in FIG. 4, a DCI decoding error has occurred in a cell 1 of the slot #0 and a cell 2 of the slot #1. In this case, in FIG. 4, as with the operation of FIG. 2, the terminal can identify that a DCI decoding error has occurred in the cell 1 of the slot #0 and the cell 2 of the slot #1. However, not having normally received DCI in the cell 1 of the slot #0 and the cell 2 of the slot #1, the terminal cannot identify the number of CBGs in each of the cell 1 of the slot #0 and the cell 2 of the slot #1, and cannot identify a HARQ-ACK (NACK) count for the cell 1 of the slot #0 and the cell 2 of the slot #1.

In this manner, the HARQ-ACK bit series may not be appropriately transmitted at the time of HARQ-ACK transmission for each CBG. Thus, in the following, a method capable of appropriately performing retransmission control for each CBG is described.

[General Outline of Communication System]

A communication system according to each embodiment of the present disclosure includes a base station 100 (gNB) and a terminal 200 (UE).

Figure 5:
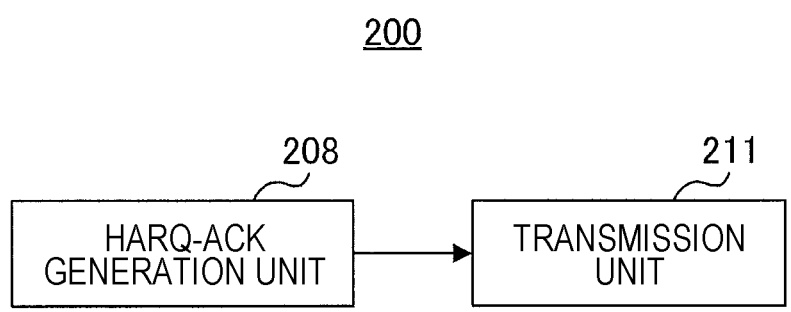
FIG. 5 illustrates part of the structure of a terminal according to a first embodiment.

FIG. 5 is a block diagram illustrating a partial structure of the terminal 200 according to one embodiment of the present disclosure. In the terminal 200 illustrated in FIG. 5, a HARQ-ACK generation unit 208 generates a response signal (HARQ-ACK) for each code block group based on a first parameter (counter DAI) included in each of a plurality of downlink control signals (for example, DL assignment), the first parameter indicating a cumulative count of code block groups (CBGs) configuring each of a plurality of transport blocks (TBs) assigned by the plurality of downlink control signals. A transmission unit 211 collectively transmits response signals for each code block group.

[Structure of Base Station]

Figure 6:
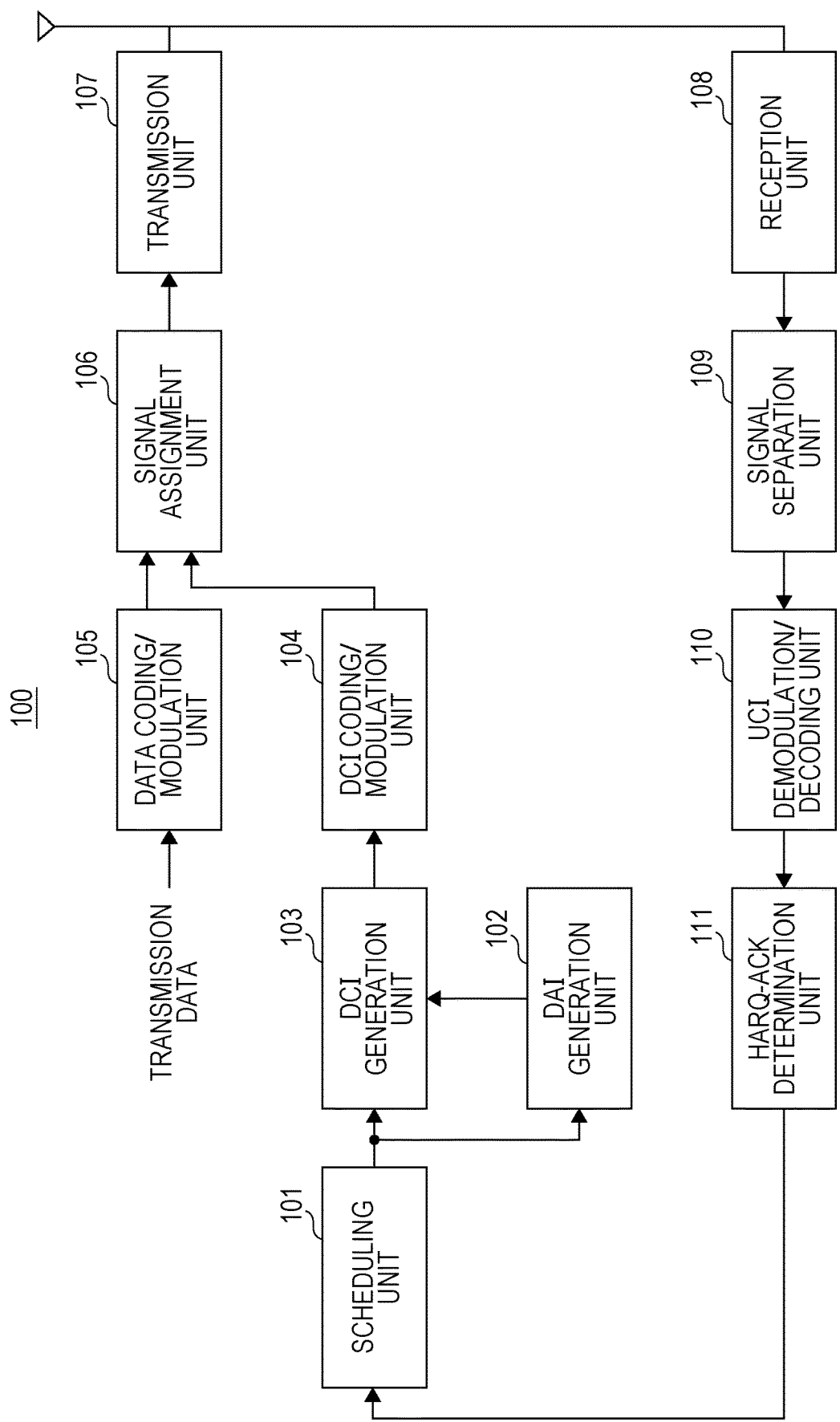
FIG. 6 illustrates the structure of a base station according to the first embodiment.

FIG. 6 is a block diagram illustrating the structure of the base station 100 according to the present embodiment. In FIG. 6, the base station 100 has a scheduling unit 101, a DAI generation unit 102, a DCI generation unit 103, a DCI coding/modulation unit 104, a data coding/modulation unit 105, a signal assignment unit 106, a transmission unit 107, a reception unit 108, a signal separation unit 109, a UCI demodulation/decoding unit 110, and a HARQ-ACK determination unit 111.

The scheduling unit 101 uses the determination result inputted from the HARQ-ACK determination unit 111 to perform scheduling for the terminal 200, and outputs scheduling information indicating the scheduling result to the DAI generation unit 102 and the DCI generation unit 103. The scheduling information includes information about a terminal as a DL data transmission destination and information about CBGs of data to be transmitted (such as CBG number and the number of CBGs).

The DAI generation unit 102 generates a DAI (for example, counter DAI or total DAI) based on the scheduling information inputted from the scheduling unit 101. For example, the DAI generation unit 102 may calculate the counter DAI or total DAI from the previous DL data count in the bundling window. The DAI generation unit 102 outputs DAI information indicating the generated DAI to the DCI generation unit 103. Note that the definition of the counter DAI/total DAI may be based on the definition described in NPL 2.

The DCI generation unit 103 generates a bit series (DCI bit series) of a control signal (for example, DL assignment) indicating a resource to which DL data is assigned, based on the scheduling information inputted from the scheduling unit 101 and the DAI information inputted from the DAI generation unit 102. The DCI also includes, for example, information about the CBG number and the number of CBGs. The DCI generation unit 103 outputs the DCI bit series to the DCI coding/modulation unit 104.

The DCI coding/modulation unit 104 performs error-correction coding on the DCI bit series inputted from the DCI generation unit 103, modulates the signal after coding, and outputs the signal after modulation (symbol series) to the signal assignment unit 106.

The data coding/modulation unit 105 performs error-correction coding on the bit series (DL data) of the inputted transmission data, modulates the signal after coding, and outputs the signal after modulation (symbol series) to the signal assignment unit 106. Note that the transmission data may include upper-layer signaling (for example, RRC (radio resource control) signaling.

The signal assignment unit 106 assigns the symbol series (DCI) inputted from the DCI coding/modulation unit 104 and the symbol series (DL data) inputted from the data coding/modulation unit 105 to a downlink resource (for example, a time/frequency resource). Note that a transmission signal is subjected to transmission waveform generation such as OFDM (orthogonal frequency division multiplexing) (not illustrated). With this, a transmission signal including the DCI or DL data is formed. The formed transmission signal is outputted to the transmission unit 107.

The transmission unit 107 performs wireless transmission process such as up-conversion on the transmission signal inputted from the signal assignment unit 106, and transmits the resultant signal via an antenna to the terminal 200.

The reception unit 108 receives a signal transmitted from the terminal 200 via the antenna, performs wireless reception process such as down-conversion on the reception signal, and outputs the resultant signal to the signal separation unit 109.

The signal separation unit 109 separates UCI (uplink control information) from the reception signal received from the reception unit 108, and outputs the UCI to the UCI demodulation/decoding unit 110.

The UCI demodulation/decoding unit 110 demodulates and decodes the UCI inputted from the signal separation unit 109, and outputs the UCI after decoding to the HARQ-ACK determination unit 111.

The HARQ-ACK determination unit 111 determines HARQ-ACK for the DL data included in the UCI inputted from the UCI demodulation/decoding unit 110, and outputs the determination result to the scheduling unit 101.

[Structure of Terminal]

Figure 7:
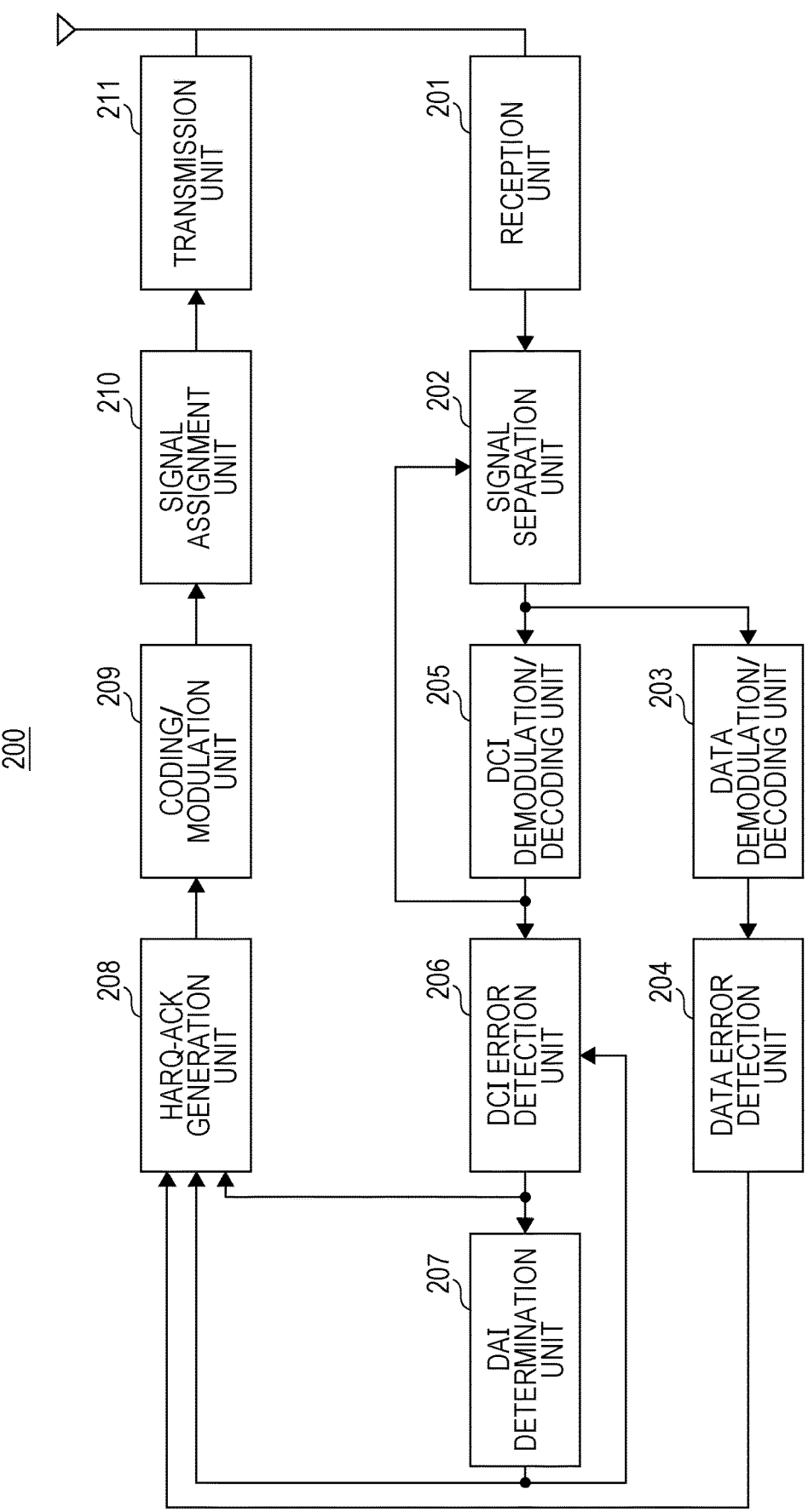
FIG. 7 illustrates the structure of the terminal according to the first embodiment.

FIG. 7 is a block diagram illustrating the structure of the terminal 200 according to the present embodiment.

In FIG. 7, the terminal 200 has a reception unit 201, a signal separation unit 202, a data demodulation/decoding unit 203, a data error detection unit 204, a DCI demodulation/decoding unit 205, a DCI error detection unit 206, a DAI determination unit 207, a HARQ-ACK generation unit 208, a coding/modulation unit 209, a signal assignment unit 210, and a transmission unit 211.

The reception unit 201 performs reception process such as down-conversion on a reception signal received via an antenna, and then outputs the resultant signal to the signal separation unit 202.

The signal separation unit 202 separates DCI from the reception signal received from the reception unit 201, and outputs the DCI to the DCI demodulation/decoding unit 205. Also, the signal separation unit 202 separates DL data from the reception signal based on DL assignment information (DL assignment) inputted from the DCI demodulation/decoding unit 205, and outputs the DL data to the data demodulation/decoding unit 203.

The data demodulation/decoding unit 203 demodulates and decodes the DL data inputted from the signal separation unit 202, and outputs the DL data after decoding to the data error detection unit 204.

The data error detection unit 204 performs error detection on the DL data inputted from the data demodulation/decoding unit 203, and outputs the error detection result to the HARQ-ACK generation unit 208. Note that when the DL data is configured of a plurality of CBGs, the data error detection unit 204 outputs the error detection result for each CBG to the HARQ-ACK generation unit 208.

The DCI demodulation/decoding unit 205 demodulates and decodes the DCI inputted from the signal separation unit 202, and outputs the DCI after decoding to the signal separation unit 202 and the DCI error detection unit 206.

The DCI error detection unit 206 performs error detection on the DCI (for example, determination as to the presence or absence of a DCI decoding error), based on the DCI inputted from the DCI demodulation/decoding unit 205 and a DAI inputted from the DAI determination unit 207, and outputs the error detection result to the HARQ-ACK generation unit 208. When a DCI error is absent, the DCI error detection unit 206 outputs the DCI to the DAI determination unit 207.

The DAI determination unit 207 determines a value of the DAI (for example, counter DAI or total DAI) from the DCI inputted from the DCI error detection unit 206, and outputs the determined DAI to the DCI error detection unit 206 and the HARQ-ACK generation unit 208. The DAI determination unit 207 may determine the value of the counter DAI/total DAI based on, for example, the description of NPL 2.

The HARQ-ACK generation unit 208 generates HARQ-ACK based on the error detection result inputted from the data error detection unit 204, the error detection result inputted from the DCI error detection unit 206, and the DAI inputted from the DAI determination unit 207. The HARQ-ACK generation unit 208 outputs the generated HARQ-ACK (bit series) to the coding/modulation unit 209. Note that details of a method of generating a HARQ-ACK bit series in the HARQ-ACK generation unit 208 will be described further below.

The coding/modulation unit 209 performs error-correction coding and modulates the HARQ-ACK inputted from the HARQ-ACK generation unit 208. The coding/modulation unit 209 outputs the HARQ-ACK (symbol series) after modulation to the signal assignment unit 210.

The signal assignment unit 210 assigns UCI including the HARQ-ACK inputted from the coding/modulation unit 209 to an uplink resource (for example, a time/frequency resource) for output to the transmission unit 211. Note that a transmission signal is subjected to transmission waveform generation such as OFDM (not illustrated). With this, a transmission signal including the UCI is formed. The formed transmission signal is outputted to the transmission unit 211.

The transmission unit 211 performs transmission process such as up-conversion on the signal inputted from the signal assignment unit 210, and transmits the resultant signal via the antenna.

[Operations of Base Station 100 and Terminal 200]

Operations in the base station 100 and the terminal 200 having the above-described structures are described in detail.

Figure 8:
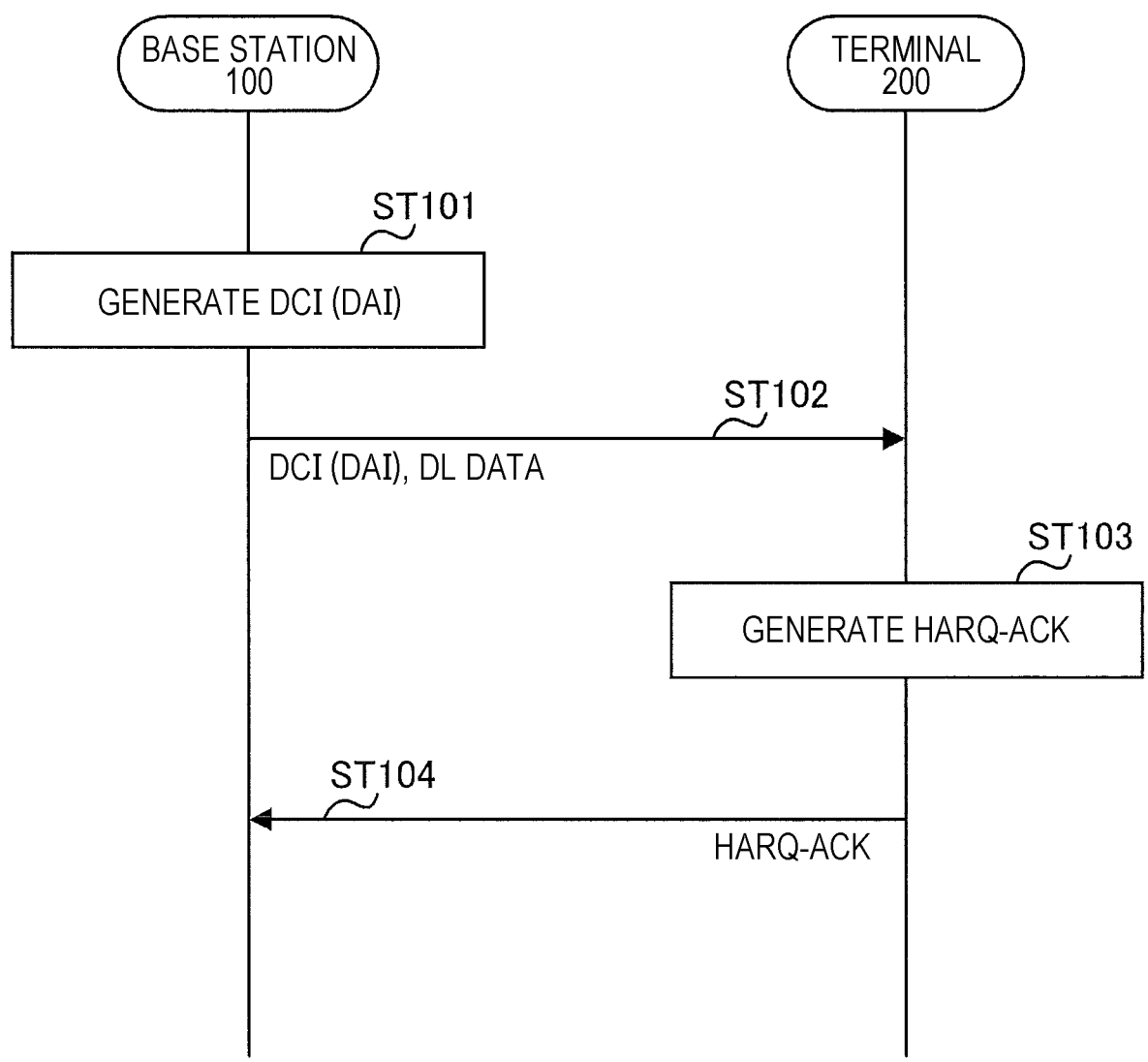
FIG. 8 illustrates an operation example of the base station and the terminal according to the first embodiment.

FIG. 8 is a sequence diagram illustrating operations of the base station 100 and the terminal 200.

The base station 100 generates DCI including a DAI (for example, counter DAI or total DAI) for the terminal 200 (ST101). Then, the base station 100 transmits the generated DCI and DL data assigned by the DCI (that is, DL assignment) to the terminal 200.

Upon receiving the DCI and the DL data at ST102, the terminal 200 generates, based on the DCI (DAI), HARQ-ACK for the DL data for each CBG (ST103), and collectively transmits the generated HARQ-ACKs to the base station 100 (ST104).

Next, details of methods of generating a HARQ-ACK bit series (process at ST103 of FIG. 8) are described.

<Generation Method 1-1>

In a generation method 1-1, the base station 100 notifies, by using the DAI, the terminal 200 of a cumulative count of CBGs with DL data for the terminal 200 assigned thereto and a total number of CBGs included in a HARQ-ACK bit series. The terminal 200 generates HARQ-ACK for each CBG, based on the DAI, notification of which is provided from the base station 100.

For example, the counter DAI and the total DAI configuring a DAI are defined as follows.

counter DAI: a cumulative count of CBGs total DAI: a total number of CBGs

Since HARQ-ACK of 1 bit is generated for each CBG, the total DAI indicates the number of bits of HARQ-ACK the terminal 200 collectively transmits once.

Here, the number of bits of the counter/total DAI may be implicitly determined in accordance with the maximum number of CBGs or the like. For example, when it is defined that the maximum number of CBGs is 8 and a counter takes a round upon four DL assignment receptions, the number of bits of the counter/total DAI is 5 bits (8*4=⇒5 bits).

The DAI generation unit 102 of the base station 100 calculates a counter DAI (cumulative count of CBGs) and a total DAI (total number of CBGs) by following the above-described definition based on the number of CBGs of the DL data, previous DL data transmission history in the bundling window, and current DL data scheduling information to generate a DAI including the counter DAI and the total DAI.

That is, the counter DAI included in each of the plurality of pieces of DCI (DL assignment) transmitted from the base station 100 to the terminal 200 indicates a cumulative count of CBGs configuring each of the plurality of TBs assigned by the plurality of pieces of DCI. Also, the total DAI included in each of the plurality of pieces of DCI (DL assignment) transmitted from the base station 100 to the terminal 200 indicates a total number (setting value) of CBGs assigned by the plurality of pieces of DCI.

Figure 9:
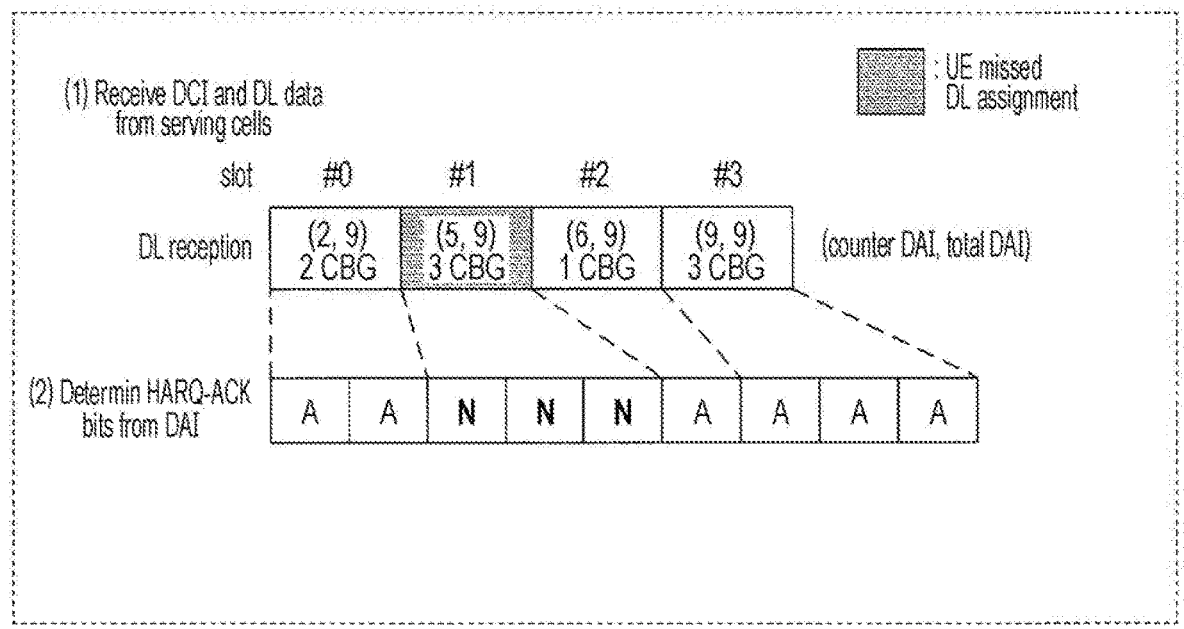
FIG. 9 illustrates one example of HARQ-ACK transmission process when TDD is applied according to a generation method 1-1.
Figure 10:
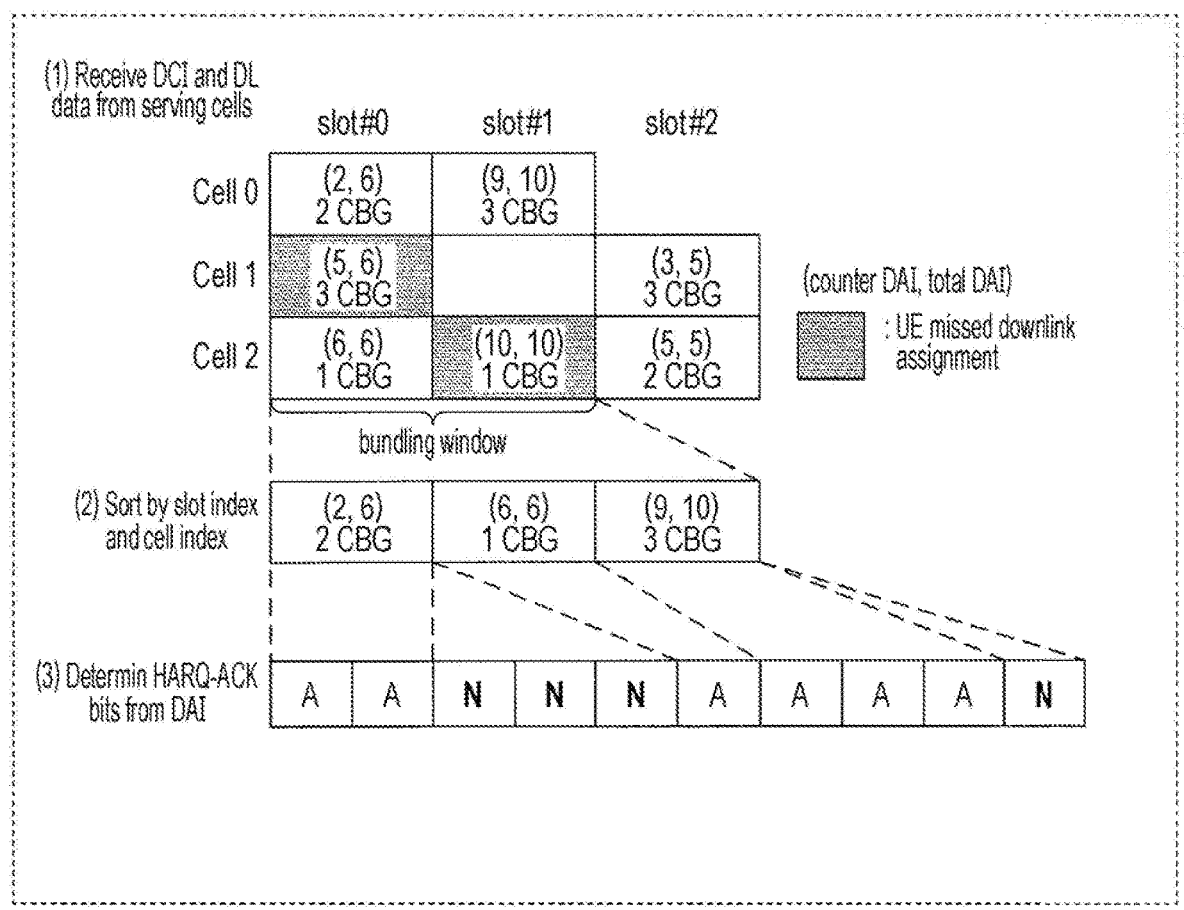
FIG. 10 illustrates one example of HARQ-ACK transmission process when CA is applied according to the generation method 1-1.

FIG. 9 illustrates one example of HARQ-ACK transmission when TDD is applied, and FIG. 10 illustrates one example of HARQ-ACK transmission when CA is applied.

For example, when TDD is applied as illustrated in FIG. 9, the number of CBGs of DL data assigned to the terminal 200 by DCI (DL assignment), notification of which is provided in slots #0 to #3, is dynamically changed as 2 CBGs, 3 CBGs, 1 CBG, and then 3 CBGs.

If a total number of CBGs when HARQ-ACKs are collectively transmitted is taken as 9 CBGs, the base station 100 (DAI generation unit 102) sets 9 to the total DAI. Also, the base station 100 sets 2, 5, 6, and 9 to the counter DAI included in each piece of DCI (DL assignment) in accordance with the number of CBGs assigned by each piece of DCI (previous DCI and current DCI). With this, the DAI (counter DAI, total DAI) to be transmitted in the slots #0 to #3 are (2, 9), (5, 9), (6, 9), and (9, 9), respectively.

Here, in FIG. 9, a DCI decoding error has occurred in the slot #1, and the terminal 200 has not recognized DAI (5, 9) in the slot #1.

However, the terminal 200 (HARQ-ACK generation unit 208) generates a HARQ-ACK bit series, which is a result of reception of DL data in each slot (including the slot #1), for each CBG (9 CBGs in FIG. 9) based on the values of the received DAI (DAI in the slots #0, #2, and #3 in FIG. 9). For example, (counter DAI—the number of CBGs of DL data) indicates a minimum index of an ACK bit for each CBG. Also, the codebook size takes the value of the total DAI.

Specifically, the terminal 200 generates HARQ-ACKs corresponding to 2 CBGs, 1 CBG, and 3 CBGs in the slots #0, #2, and #3, respectively.

Also, since the DAI of the slot #0 is (2, 9) and the DAI of the slot #2 is (6, 9), the terminal 200 can determine that DL data (CBG) of 3 CBGs (corresponding to counter DAI=3, 4, 5) has been transmitted from the base station 100 in the slot #1 in which the result of reception of DL data is absent. That is, the terminal 200 generates HARQ-ACK of 3 bits corresponding to 3 CBGs in the slot #1. Also, when the result of reception of DL data is absent due to a DCI decoding error or the like, the terminal 200 sets NACK (three NACKs in FIG. 9) as HARQ-ACK.

With this, in FIG. 9, the terminal 200 generates a HARQ-ACK bit series of 9 bits respectively corresponding to 9 CBGs. The terminal 200 collectively transmits the HARQ-ACK bit series of 9 bits to the base station 100.

The base station 100 (HARQ-ACK determination unit 111) determines the result of reception of each CBG in the terminal 200 by following the above-described HARQ-ACK definition similar to that of the terminal 200 based on the HARQ-ACK bit series included in the UCI.

Next, when CA is applied as illustrated in FIG. 10, the number of CBGs of DL data assigned to the terminal 200 by DCI (DL assignment), notification of which is provided in slots #0 to #2 and cells 0 to 2, is dynamically changed.

A total number of CBGs when HARQ-ACKs are collectively transmitted in the bundling window (slots #0 and #1) illustrated in FIG. 10 is taken as 10 CBGs. In this case, in the first slot #0 in the bundling window, the base station 100 (DAI generation unit 102) sets 6, which is the total number of CBGs in the slot #0, to the total DAI. This is because, in the slot #0, scheduling for the slot #1, which is a future slot, is not determined at the base station 100. Also, the base station 100 sets 2, 5, and 6 to the counter DAI included in the DCI of each cell of the slot #0 in accordance with the number of CBGs assigned by the DCI in each cell of the slot #0. With this, the DAI (counter DAI, total DAI) to be transmitted in the cells 0 to 2 of the slot #0 are (2, 6), (5, 6), and (6, 6), respectively.

Also, in the subsequent slot #1 in the bundling window, the base station 100 sets 10, which is a total of the total number (6) of CBGs of the previous slot (slot #0) in the bundling window and the total number (4) of CBGs of the slot #1, to the total DAI. Also, the base station 100 sets 9 and 10 to the counter DAI included in the DCI of each cell of the slot #1 in accordance with the number of CBGs assigned by the DCI in each of the cells (cells 0 and 2) of the slot #1. With this, the pieces of DAI (counter DAI, total DAI) to be transmitted in the cells 0 and 2 of the slot #1 are (9, 10) and (10, 10), respectively.

Here, in FIG. 10, a DCI decoding error has occurred in the cell 1 of the slot #0 and the cell 2 of the slot #1, and the terminal 200 has not recognized DAI (5, 6) and (10, 10) in the cell 1 of the slot #0 and the cell 2 of the slot #1.

However, the terminal 200 (HARQ-ACK generation unit 208) generates a HARQ-ACK bit series, which is a result of reception of DL data in each slot and each cell, for each CBG (10 CBGs in FIG. 10) based on the value of the received DAI. For example, (counter DAI—the number of CBGs of DL data) indicates a minimum index of an ACK bit for each CBG in each slot and cell. Also, the codebook size takes the value of the total DAI.

Specifically, the terminal 200 generates HARQ-ACKs corresponding to 2 CBGs, 1 CBG, and 3 CBGs in the cells 0 and 2 of the slot #0 and the cell 0 of the slot #1, respectively, in the bundling window.

Also, since the DAI of the cell 0 of the slot #0 is (2, 6) and the DAI of the cell 2 of the slot #0 is (6, 6), the terminal 200 can determine that DL data (CBG) of 3 CBGs (corresponding to the counter DAI=3, 4, 5) in the cell 1 of the slot #0 in which the result of reception of DL data is absent has been transmitted from the base station 100. That is, in the cell 1 of the slot #0, the terminal 200 generates HARQ-ACK of 3 bits corresponding to 3 CBGs. Similarly, since the DAI of the cell 0 in the slot #1 is (9, 10), the terminal 200 can determine that DL data of 1 CBG (corresponding to the counter DAI=10) in the cell 2 in which the result of reception of DL data is absent has been transmitted from the base station 100. That is, in the cell 2 of the slot #1, the terminal 200 generates HARQ-ACK of 1 bit corresponding to 1 CBG. Also, when the result of reception of DL data is absent due to a DCI decoding error or the like, the terminal 200 sets NACK (four NACKs in FIG. 10) as HARQ-ACK.

With this, in FIG. 10, the terminal 200 generates a HARQ-ACK bit series of 10 bits respectively corresponding to 10 CBGs in the bundling window. The terminal 200 collectively transmits the HARQ-ACK bit series of 10 bits to the base station 100.

The base station 100 (HARQ-ACK determination unit 111) determines the result of reception for each CBG at the terminal 200 by following the above-described definition of HARQ-ACK similar to that of the terminal 200 based on the HARQ-ACK bit series included in the UCI.

In this manner, according to the generation method 1-1, the terminal 200 can generate a HARQ-ACK bit series for each CBG without adding an additional bit to the UCI, compared with the structure of LTE (for example, refer to FIG. 1). Also, the base station 100 receives HARQ-ACK for the DL data for each CBG transmitted to the terminal 200, and can correctly determine a reception situation at the terminal 200 for each CBG.

<Generation Method 1-2>

In the generation method 1-1, it can be thought that the scheduling unit 101 (scheduler) of the base station 100 cannot predict resource assignment of DL data and a HARQ-ACK codebook size in a future slot rather than the current slot. In this case, the base station 100 cannot correctly set the value of the total DAI in an initial slot.

Thus, in a generation method 1-2, each of the plurality of pieces of DCI (DL assignment), notification of which is provided from the base station 100 to the terminal 200, includes a counter DAI, and does not include a total DAI indicating the total number of CBGs (setting value). Note in the generation method 1-2 that notification of the total DAI for use in the generation method 1-1 may be abolished and a total DAI may be used for notification of another parameter. The other operations of the base station 100 and the terminal 200 are similar to those in the generation method 1-1.

Also in the generation method 1-2, the HARQ-ACK codebook size may be semi-statically set by RRC signaling or the like, or may be dynamically set by DCI or the like. When the HARQ-ACK codebook size is dynamically set, the HARQ-ACK codebook size may have a value larger than the actual number of DL assignments and number of CBGs. Also, if HARQ-ACK for SPS (semi-persistent scheduling) is present, the terminal 200 may add HARQ-ACK for SPS to the tail of the HARQ-ACK bit series.

Specifically, as with the generation method 1-1, the DAI generation unit 102 of the base station 100 generates a counter DAI, but does not generate a total DAI. That is, the DAI, notification of which is provided from the base station 100 to the terminal 200, includes a counter DAI but does not include a total DAI.

The DAI determination unit 207 of the terminal 200 determines a value of the counter DAI from the received DCI. That is, at the terminal 200, a determination of a total DAI is not made.

Also, the HARQ-ACK generation unit 208 of the terminal 200 determines a HARQ-ACK codebook size based on a value set not by a total DAI but RRC signaling or the like or the DCI or the like.

Then, as with the generation method 1-1, the terminal 200 generates HARQ-ACK for each CBG based on the counter DAI and the HARQ-ACK codebook size. For example, the terminal 200 may collectively transmit, to the base station 100, HARQ-ACK for each CBG generated until the set timing of UL transmission in the range of the HARQ-ACK codebook size.

According to the generation method 1-2, the base station 100 can set the HARQ-ACK codebook size without using a total DAI. Also, when DCI is not used for notification of the HARQ-ACK codebook size, DCI overhead can be reduced.

<Generation Method 1-3>

In a generation method 1-3, the total DAI (the setting value of the total number of CBGs) is allowed to be set at a value larger than the number of CBGs actually assigned to the terminal 200. The other operations of the base station 100 and the terminal 200 are similar to those in the generation method 1-1.

In the generation method 1-3, the numbers of bits of the counter DAI and the total DAI are semi-statically set by RRC signaling or the like. When the value larger than the number of CBGs actually assigned by the base station 100 to the terminal 200 is set as the total DAI, the number of bits of the counter/total DAI needs to be set at a larger value.

The DAI generation unit 102 of the base station 100 generates a counter DAI or total DAI by following the number of bits of the counter/total DAI determined in advance. The number of bits of the counter/total DAI may be determined, for example, at a maximum number of CBGs or based on, for example, how much difference is allowed between the number of CBGs, notification of which is provided by the total DAI, and the number of CBGs actually received by the terminal 200. For example, when it is assumed that the maximum number of CBGs is 8 and a difference between the number of CBGs, notification of which is provided by the total DAI, and the number of CBGs actually received by the terminal 200 is allowed to be up to eight times, the number of bits of each DAI is 6 bits (8*8=64⇒6 bits). The base station 100 sets the total DAI at a value larger than an actual one in a range of falling within the allowable difference.

The DAI determination unit 207 of the terminal 200 determines a value of the counter/total DAI from the received DCI by following the number of bits of the counter/total DAI set in advance.

According to the generation method 1-3, even if the base station 100 cannot correctly set the value of the total DAI in the initial slot, the base station 100 can set the value of the total DAI. Also, compared with the case in which the HARQ-ACK codebook size is semi-statically set as in the generation method 1-2, in the generation method 1-3, the base station 100 can dynamically set the codebook size by using the total DAI, and thus UCI overhead can be reduced.

<Generation Method 2-1>

In the generation method 1-1, the number of bits of HARQ-ACK set per TB assigned by DCI (DL assignment) (that is, the number of HARQ-ACK bits per DL assignment) is equal to the number of CBGs configuring that TB (for example, refer to FIG. 9 and FIG. 10).

By contrast, in a generation method 2-1, the number of HARQ-ACK bits per DL assignment is taken as a fixed value, irrespective of the number of CBGs assigned by that DL assignment. The terminal 200 generates HARQ-ACK for each CBG based on the fixed number of HARQ-ACK bits per DL assignment.

For example, when the maximum number of CBGs assigned by one DL assignment is 3, the number of HARQ-ACK bits per DL assignment may be taken as 3. The number of HARQ-ACK bits per DL assignment may be implicitly determined in accordance with the maximum number of CBGs, may be semi-statically set by RRC signaling or the like, or may be dynamically set by DCI or the like. However, the number of HARQ-ACK bits per DL assignment is set to have the same setting value in the bundling window even if dynamically set.

Also in the generation method 2-1, unlike the generation methods 1-1 to 1-3 (the cumulative count of CBGs), the counter DAI is set for each TB (that is, DL assignment transmission). That is, in the generation method 2-1, the counter DAI (that is, the cumulative count of DL assignment transmissions) is set by a method similar to LTE (for example, refer to FIG. 1).

Also, when the number of CBGs received based on the assignment by one DL assignment is smaller than the number of HARQ-ACK bits per DL assignment (fixed value), the HARQ-ACK generation unit 208 of the terminal 200 sets NACK to the remaining bits.

Figure 11:
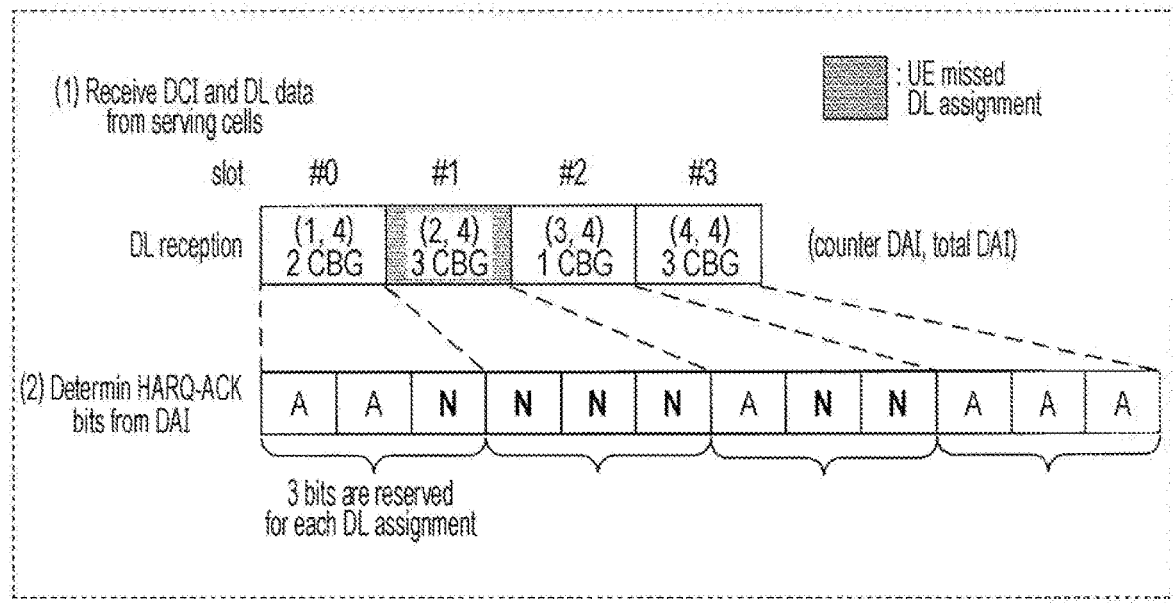
FIG. 11 illustrates one example of HARQ-ACK transmission process when TDD is applied according to a generation method 2-1.
Figure 12:
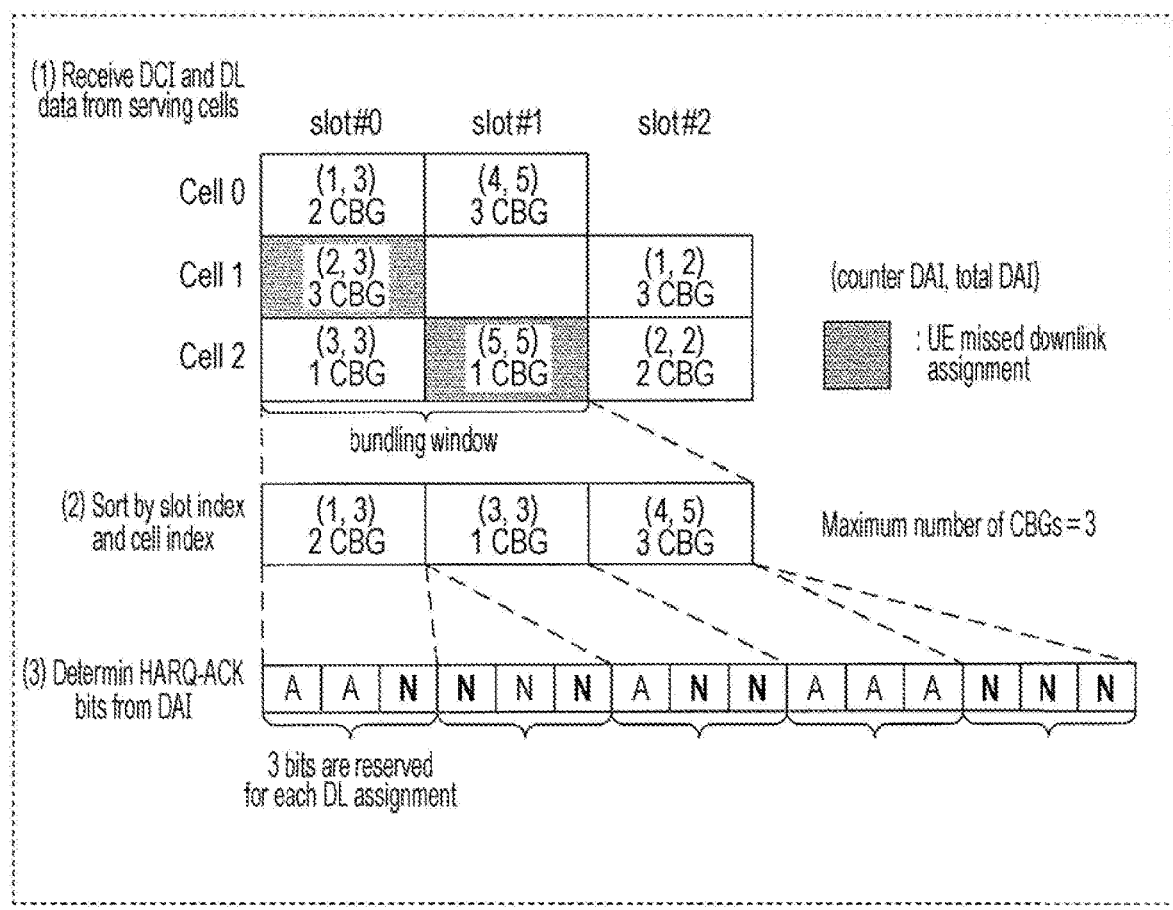
FIG. 12 illustrates one example of HARQ-ACK transmission process when CA is applied according to the generation method 2-1.

FIG. 11 illustrates one example of HARQ-ACK transmission when TDD is applied, and FIG. 12 illustrates one example of HARQ-ACK transmission when CA is applied.

As illustrated in FIG. 11 and FIG. 12, the number of CBGs of DL data in each slot or each cell is dynamically changed. However, as illustrated in FIG. 11 and FIG. 12, the number of HARQ-ACK bits per DL assignment is fixed at 3 bits, irrespective of the number of CBGs.

The HARQ-ACK generation unit 208 of the terminal 200 generates a HARQ-ACK bit series by following the set number of bits (3 bits in FIG. 11 and FIG. 12). For example, in a slot #0 illustrated in FIG. 11, the number of CBGs received by following DL assignment is two, and the terminal 200 thus sets HARQ-ACK for each CBG (ACK or NACK; ACK in FIG. 11) to 2 bits among 3 bits set as the number of HARQ-ACK bits, and sets NACK to the remaining 1 bit. The same goes for the other slots #2 and #3.

Also, even in a slot #1 in which a DCI decoding error has occurred, the HARQ-ACK generation unit 208 of the terminal 200 determines that DL data has been transmitted from the base station 100 by DL assignment (counter DAI=2) based on the counter DAI in the slot #0 and the counter DAI in the slot #2. Here, the terminal 200 cannot identify the number of CBGs transmitted in the slot #1. However, the terminal 200 sets NACK to 3 bits set as the number of HARQ-ACK bits. That is, even if a DCI decoding error has occurred, the terminal 200 can generate HARQ-ACK based on the number of HARQ-ACK bits fixedly set irrespective of the number of CBGs assigned by that DCI.

With this, in FIG. 11, the terminal 200 generates a HARQ-ACK bit series of 12 bits including HARQ-ACKs respectively corresponding to 9 CBGs, and collectively transmits the HARQ-ACK bit series to the base station 100.

Note that also in FIG. 12, the terminal 200 transmits the HARQ-ACK bit series to the base station 100 by following the number of HARQ-ACK bits (fixed value) per DL assignment in a manner similar to that of FIG. 11.

The HARQ-ACK determination unit 111 of the base station 100 determines HARQ-ACK for each CBG by following the number of bits set at the terminal 200 (3 bits in FIG. 11 and FIG. 12) based on the HARQ-ACK bit series included in the UCI. For example, in the slot #0 illustrated in FIG. 11, the number of CBGs assigned by DL assignment is two, and the base station 100 thus determines HARQ-ACK for each CBG by using 2 bits among 3 bits set as the number of HARQ-ACK bits, and determines that HARQ-ACK is not set to the remaining 1 bit. The same goes for the other slots (DL assignment).

According to the generation method 2-1, except the case in which the number of HARQ-ACK bits per DL assignment is dynamically set by DCI, HARQ-ACK transmission for each CBG can be performed without increasing DCI overhead, compared with Release 13. Also, according to the generation method 2-1, the base station 100 can dynamically set the codebook size by using the total DAI, and UCI overhead can thus be reduced.

<Generation Method 2-2>

In the generation method 2-1, when notification of the number of HARQ-ACK bits (3 bits in FIG. 11 and FIG. 12) per DL assignment is provided by DCI, DCI overhead increases.

Thus, in a generation method 2-2, patterns of the settable number of HARQ-ACK bits per DL assignment are limited. The other operations of the base station 100 and the terminal 200 are similar to those in the generation method 2-1.

FIG. 13 illustrates an example in which the settable number of HARQ-ACK bits per DL assignment is limited to four patterns. In FIG. 13, numbers of HARQ-ACK bits per DL assignment 2, 4, 6, and 8 are associated with indexes 0, 1, 2, and 3.

In the case of FIG. 13, notification of an index corresponding to the number of HARQ-ACK bits per DL assignment is provided form the base station 100 to the terminal 200. Thus, while 3 bits are originally required to provide notification of the number of HARQ-ACK bits (maximum value: 8 bits) per DL assignment, a limitation to four patterns is made, thereby allowing notification to be provided, with the number of HARQ-ACK bits per DL assignment being 2 bits.

The HARQ-ACK generation unit 208 of the terminal 200 generates a HARQ-ACK bit series by following the number of HARQ-ACK bits per DL assignment associated with the index, notification of which is provided from the base station 100. Also, the HARQ-ACK determination unit 111 of the base station 100 determines HARQ-ACK by following the number of HARQ-ACK bits per DL assignment set for the terminal 200. That is, as a fixed value set as the number of HARQ-ACK bits per DL assignment, any one of a plurality of defined candidates (four candidates in FIG. 13) is selected.

In this manner, according to the generation method 2-2, by limiting the settable number of HARQ-ACK bits per DL assignment, DCI overhead can be reduced.

Note that the patterns of the settable number of HARQ-ACK bits per DL assignment are not limited to the patterns illustrated in FIG. 13.

Also, for example, a parameter, notification of which is separately provided to the terminal 200, and a pattern of the settable number of HARQ-ACK bits per DL assignment may be associated with each other. For example, the TB size and the pattern of the number of HARQ-ACK bits per DL assignment may be associated with each other so that as the TB size set to the terminal 200 is larger, the number of HARQ-ACK bits per DL assignment is larger. This allows the base station 100 to implicitly notify the terminal 200 of the pattern of the number of HARQ-ACK bits per DL assignment. This eliminates the need for signaling for providing notification of the number of HARQ-ACK bits per DL assignment.

<Generation Method 2-3>

In the generation method 2-1, as one example of the number of HARQ-ACK bits per DL assignment, a value matching the maximum number of CBGs assignable per DL assignment is set. That is, for HARQ-ACK transmission for each CBG, as the number of HARQ-ACK bits per DL assignment, it is impossible to set a value equal to or smaller than the number of CBGs per DL assignment.

However, when the number of HARQ-ACK bits per DL assignment is set so as to match the maximum number of CBGs per DL assignment, if the number of actually transmitted CBGs is small, the number of unused HARQ-ACK bit series is increased to increase UCI overhead.

Thus, in a generation method 2-3, if the number of CBGs actually assigned by DL assignment is larger than the set number of HARQ-ACK bits per DL assignment (fixed value), the terminal 200 (HARQ-ACK generation unit 208) bundles HARQ-ACKs for at least two CBGs among CBGs assigned by DL assignment to generate a HARQ-ACK bit series of 1 bit. The other operations of the base station 100 and the terminal 200 are similar to those in the generation method 2-1.

Figure 14:
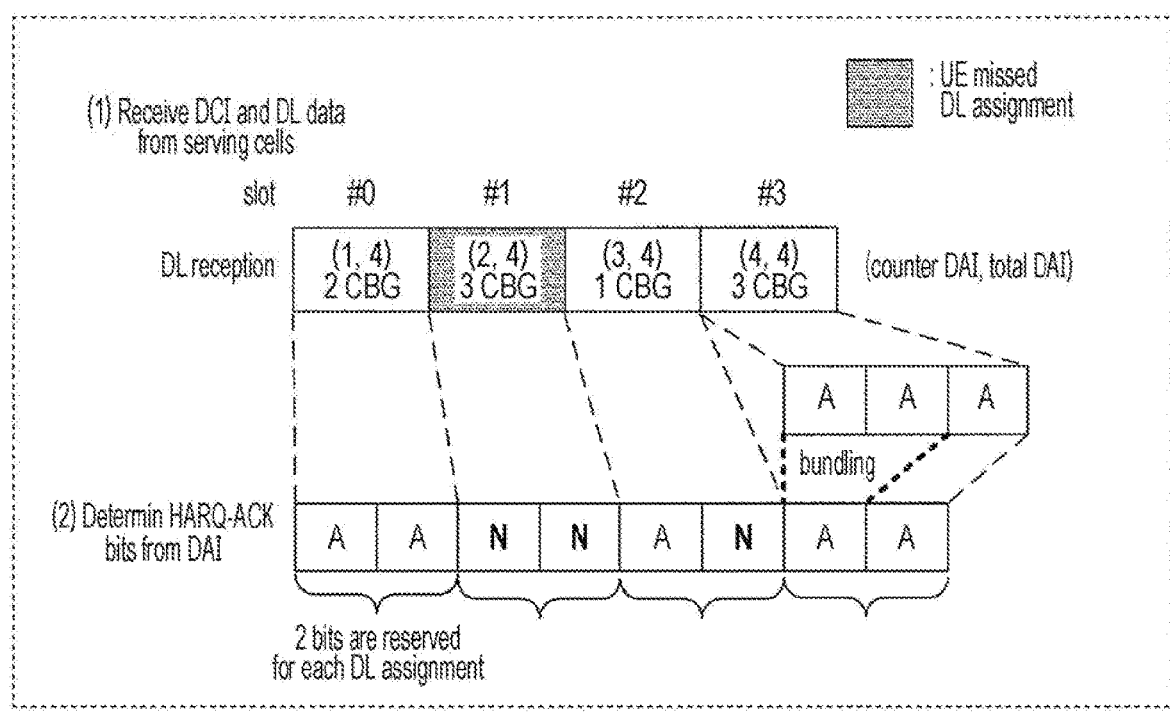
FIG. 14 illustrates one example of HARQ-ACK transmission process when TDD is applied according to a generation method 2-3.

FIG. 14 illustrates an operation example when the number of HARQ-ACK bits per DL assignment is 2 in HARQ-ACK transmission process when TDD is applied. In FIG. 14, as in slots #1 and #3, 3 CBGs may be assigned by DL assignment. That is, the number of HARQ-ACK bits per DL assignment (2 bits) is a value smaller than the maximum number of CBGs configuring a TB assigned by DL assignment.

As in the slot #3 illustrated in FIG. 14, when the number of CBGs received by the terminal 200 is 3, the HARQ-ACK generation unit 208 of the terminal 200 bundles, for example, ACK for the first CBG and ACK for the second CBG in the slot #3, to generate HARQ-ACK of 1 bit. Note that CBGs as targets to be bundled into HARQ-ACK of 1 bit are not limited to the first and second CBGs, and may be another combination.

Also, the number of CBGs bundled into HARQ-ACK may be ceil((the number of received CBGs)/(the number of HARQ-ACK bits per DL assignment)). When a fraction ((the number of received CBGs) mod (the number of HARQ-ACK bits per DL assignment)) is present, the number of the remaining CBGs may be bundled into HARQ-ACK. Also, when bundling into HARQ-ACK is performed, the bundled HARQ-ACK of 1 bit is taken as NACK if NACK of even 1 CBG is present in HARQ-ACK of a plurality of CBGs to be bundled.

When a HARQ-ACK bit series acquired by bundling by following a definition similar to that of the terminal 200 is present, the HARQ-ACK determination unit 111 of the base station 100 sets ACK or NACK, notification of which has been provided for that HARQ-ACK bit series, to all CBGs corresponding to that HARQ-ACK bit.

According to the generation method 2-3, the base station 100 can set a smaller number of HARQ-ACK bits per DL assignment, and thus UCI overhead can be reduced.

Note that while HARQ-ACK transmission process when TDD is applied has been described by way of example, the generation method 2-3 can be similarly applied also to HARQ-ACK transmission process when CA is applied.

<Generation Method 3-1>

In a generation method 3-1, the terminal 200 generates a HARQ-ACK bit for providing a notification as to whether DL assignment reception has been successful or failed (hereinafter referred to as a "DL assignment ACK bit") and a HARQ-ACK bit for providing a notification as to whether CBG reception has been successful or failed (hereinafter referred to as a "CBG ACK bit") to generate HARQ-ACK for each CBG.

Here, the DL assignment ACK bit provides a notification as to whether DL assignment reception has been successful or failed. That is, 1 bit of DL assignment ACK corresponds to one DL assignment, and the order of setting DL assignment ACK bits corresponds to the order of counter DAIs. Also, when detecting a DCI decoding error based on the normally-received counter DAI and total DAI, the terminal 200 sets NACK to the DL assignment ACK bit corresponding to the DCI decoding error.

Also, the HARQ-ACK generation unit 208 of the terminal 200 generates a DL assignment ACK bit for each slot, and then generates a CBG ACK bit for each CBG for the DL data received in each slot. Note that when the DL assignment ACK bit is NACK, the terminal 200 does not generate (add) a CBG ACK bit corresponding to that DL assignment.

Also, the HARQ-ACK codebook size may be semi-statically set by RRC signaling or the like, or may be dynamically set by DCI or the like. Note that in the set HARQ-ACK codebook size, the terminal 200 sets NACK to bits other than the CBG ACK bit and the DL assignment ACK bit (that is, the remaining bits).

Also in the generation method 3-1, unlike the generation methods 1-1 to 1-3 (the cumulative count of CBGs), the counter DAI is set for each TB (that is, DL assignment transmission). That is, in the generation method 3-1, the counter DAI (that is, the cumulative count of DL assignment transmissions) is set by a method similar to LTE (for example, refer to FIG. 1).

Figure 15:
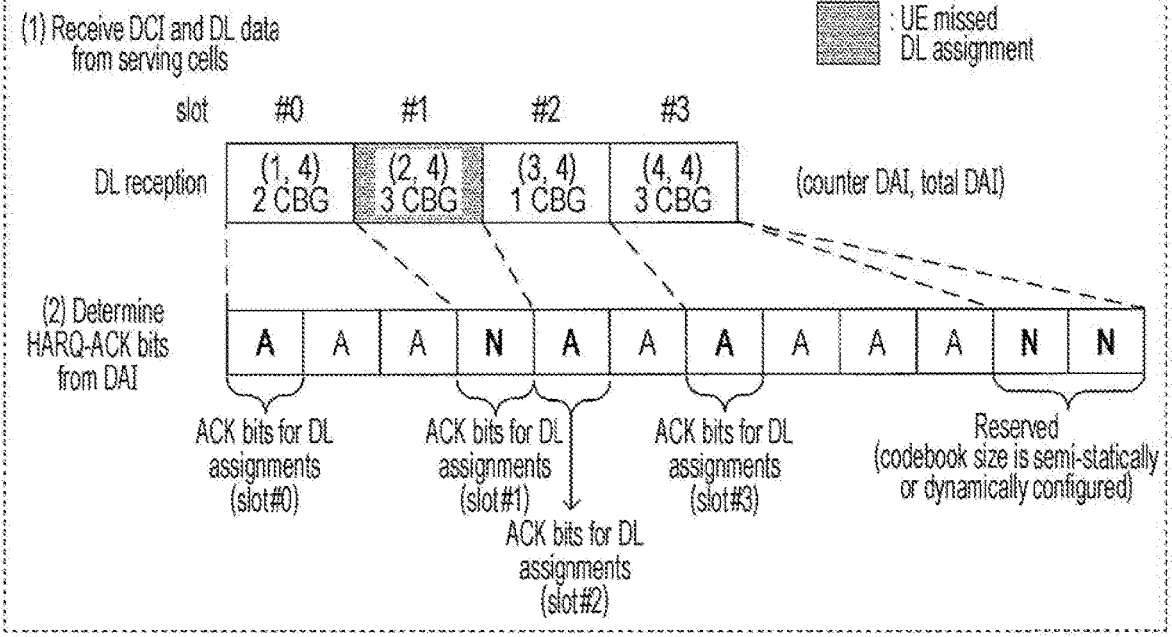
FIG. 15 illustrates one example of HARQ-ACK transmission process when TDD is applied according to a generation method 3-1.
Figure 16:
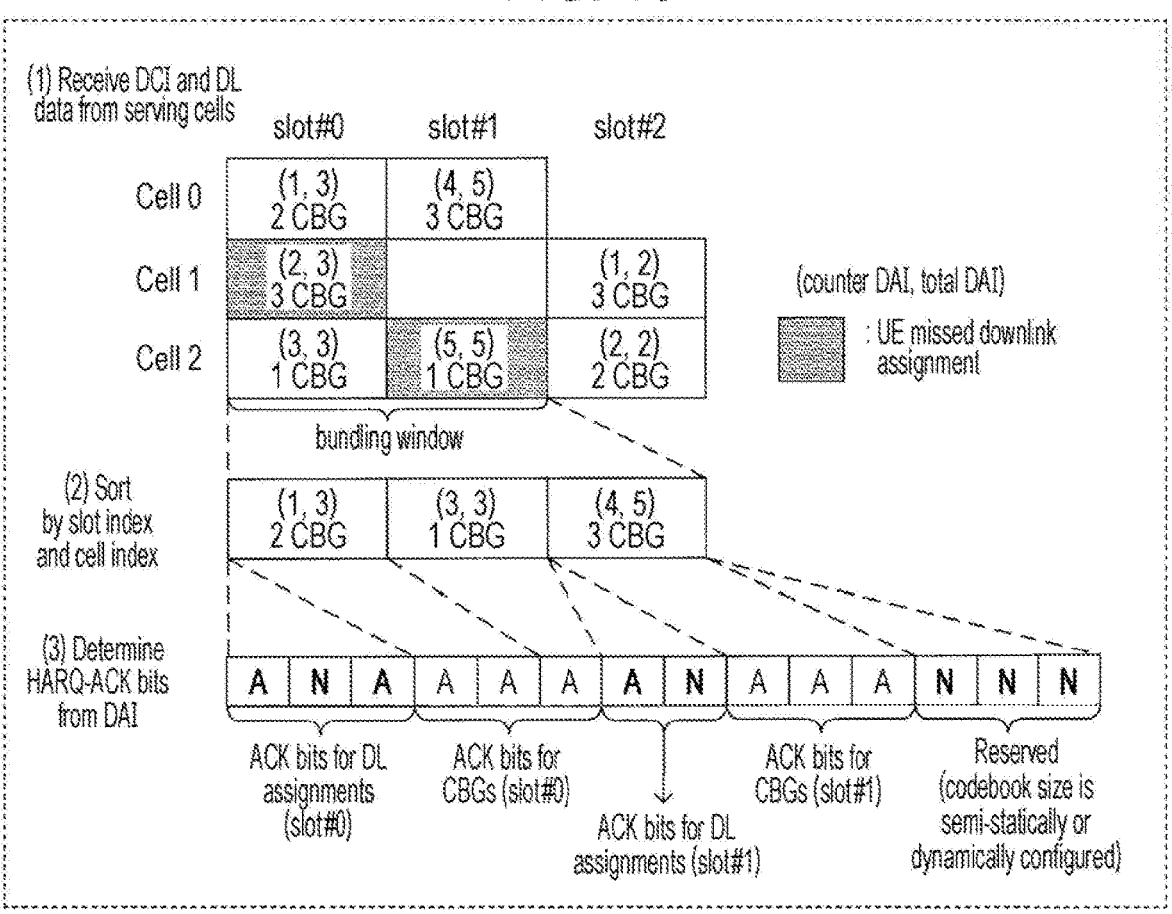
FIG. 16 illustrates one example of HARQ-ACK transmission process when CA is applied according to the generation method 3-1.

FIG. 15 illustrates one example of HARQ-ACK transmission when TDD is applied, and FIG. 16 illustrates one example of HARQ-ACK transmission when CA is applied.

As illustrated in FIG. 15 and FIG. 16, the number of CBGs of DL data in each slot or each cell is dynamically changed. Also, as the HARQ-ACK codebook size, 12 bits are set in FIG. 15, and 14 bits are set in FIG. 16.

For example, when TDD is applied as illustrated in FIG. 15, in a slot #0, the terminal 200 normally receives DL assignment, and receives DL data of 2 CBGs by following that DL assignment. Thus, the HARQ-ACK generation unit 208 of the terminal 200 sets ACK of 1 bit as a DL assignment ACK bit, and sets ACK of 2 bits (here, ACK, ACK) as CBG ACK bits. As for slots #2 and #3 illustrated in FIG. 15, HARQ-ACK is generated in a similar manner.

On the other hand, in the slot #1 illustrated in FIG. 15, the terminal 200 has not received DL assignment due to a DCI decoding error. Here, based on DAI (counter DAI, total DAI) included in DL assignment received in the slot #2, the terminal 200 identifies that a DCI decoding error has occurred (that is, DL assignment is present) in the slot #1. Thus, the terminal 200 sets NACK of 1 bit as a DL assignment ACK bit for the slot #1, and does not set CBG ACK. That is, in the slot where a DCI decoding error has occurred, HARQ-ACK of 1 bit (DL assignment ACK) is transmitted, irrespective of the number of CBGs.

Also in FIG. 15, the terminal 200 sets NACK to the remaining 2 bits not used for DL assignment ACK and CBG ACK.

Next, when CA is applied as illustrated in FIG. 16, in a slot #0, the terminal 200 normally receives DL assignment in cells 0 and 2, and receives DL data of 2 CBGs and 1 CBG, respectively, by following that DL assignment. Also, based on DAI included in DL assignment received in the cells 0 and 2 of the slot #0, the terminal 200 identifies that a DCI decoding error has occurred (that is, DL assignment is present) in a cell 1 of the slot #0. Thus, the HARQ-ACK generation unit 208 of the terminal 200 sets HARQ-ACK of 3 bits (ACK, NACK, ACK) corresponding to the cells 0 to 2 each as a DL assignment ACK bit in the slot #0, and sets ACK of 2 bits (ACK, ACK) corresponding to the cells 0 and 2 each as a CBG ACK bit. That is, CBG ACK corresponding to the cell 1 of the slot #0 is not generated. As for a slot #1 illustrated in FIG. 16, HARQ-ACK is generated in a similar manner.

In this manner, the terminal 200 generates, for each slot, a DL assignment ACK bit for each DCI (DL assignment) transmitted from the base station 100 to the terminal 200, and generates CBG ACK for TB (CBG) assigned by DL assignment normally received by the terminal 200.

The HARQ-ACK determination unit 111 of the base station 100 determines a HARQ-ACK bit series transmitted from the terminal 200 by following a definition similar to that of the terminal 200. That is, in addition to HARQ-ACK for each CBG, the base station 100 detects the presence or absence of a DL assignment decoding error.

According to the generation method 3-1, when notification of the HARQ-ACK codebook size is not provided in DCI, additional DCI overhead does not occur, compared with Release 13 eCA. Also in the generation method 3-1, compared with the generation method 2-1, the number of HARQ-ACK bits with respect to the number of CBGs per DL assignment can be flexibly set between slots.

Also, according to the generation method 3-1, with the use of DL assignment ACK, it is possible at the base station 100 to clearly determine for which DL assignment a DCI decoding error is present. Thus, the base station 100 can efficiently perform scheduling by using DL assignment ACK. For example, in scheduling, at the time of a DCI decoding error, the base station 100 performs settings (settings of RV (redundancy version) and so forth) similar to those at the time of initial transmission, and can thereby achieve an improvement in reception performance at the time of retransmission.

<Generation Method 3-2>

In the generation method 3-1, notification of the total DAI and the HARQ-ACK codebook size is provided from the base station 100 to the terminal 200. This is redundant, and DCI overhead increases.

Thus, in a generation method 3-2, each of a plurality of pieces of DCI (DL assignment), notification of which is provided from the base station 100 to the terminal 200, includes a counter DAI, and does not include a total DAI indicating a cumulative count of DL assignment transmissions. Note in the generation method 3-2 that notification of the total DAI for use in the generation method 3-1 may be abolished and a total DAI may be used for notification of another parameter.

Also, while DL assignment ACK is generated for each slot in the generation method 3-1 (for example, refer to FIG. 15 and FIG. 16), the terminal 200 sequentially generates a DL assignment ACK bit and CBG ACK for each DL assignment (that is, counter DAI) in the generation method 3-2.

The other operations of the base station 100 and the terminal 200 are similar to those in the generation method 3-1.

Also, the HARQ-ACK codebook size may be semi-statically set by RRC signaling or the like, or may be dynamically set by DCI or the like. Note that in the set HARQ-ACK codebook size, the terminal 200 sets NACK to bits other than the CBG ACK bit and the DL assignment ACK bit (that is, the remaining bits).

With this, in the generation method 3-2, even if the terminal 200 has failed to receive the last DL assignment in the bundling window, NACK is set as DL assignment ACK for that DL assignment, thereby eliminating the need for a total DAI (details will be described further below).

Note that if HARQ-ACK for SPS is present, the terminal 200 may add HARQ-ACK for SPS to the tail of the HARQ-ACK bit series. This can maintain the above-described characteristic of eliminating the need for a total DAI.

Figure 17:
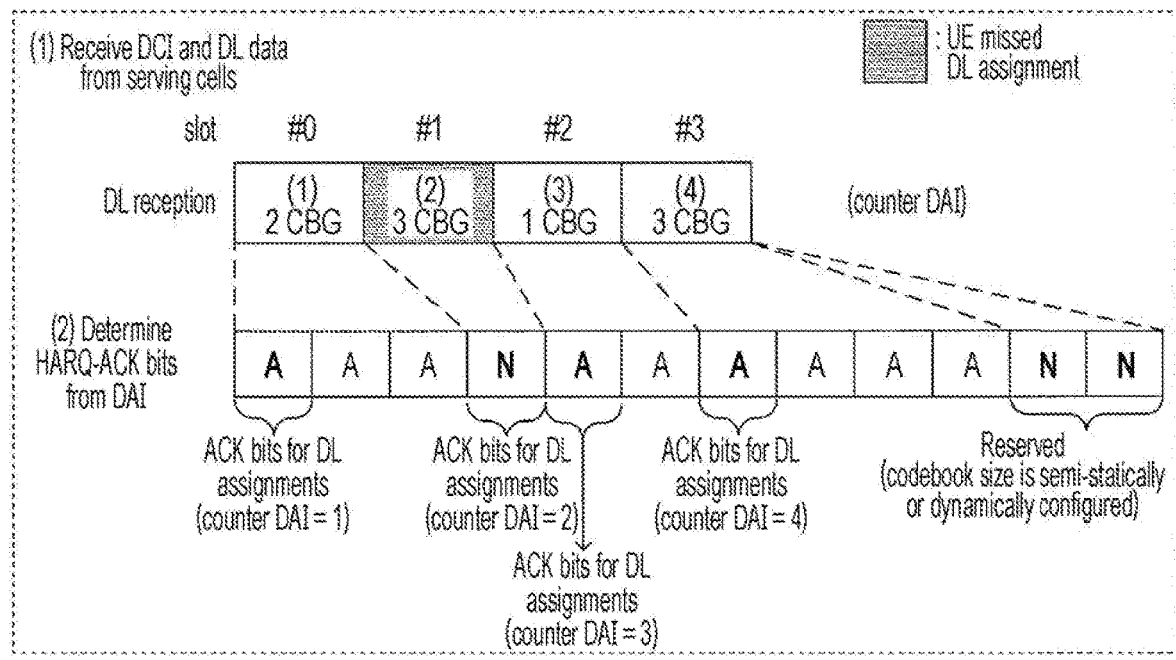
FIG. 17 illustrates one example of HARQ-ACK transmission process when TDD is applied according to a generation method 3-2.
Figure 18:
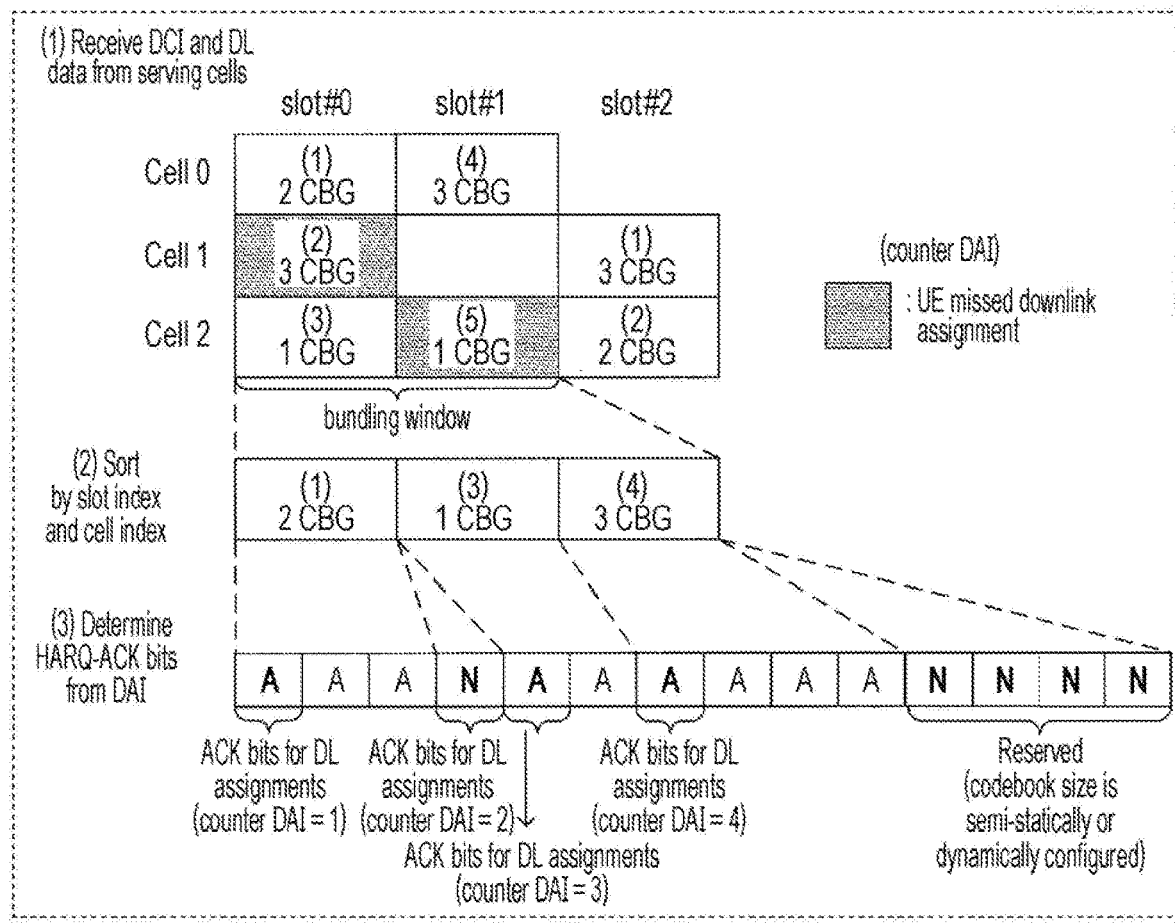
FIG. 18 illustrates one example of HARQ-ACK transmission process when CA is applied according to the generation method 3-2.

FIG. 17 illustrates one example of HARQ-ACK transmission when TDD is applied, and FIG. 18 illustrates one example of HARQ-ACK transmission when CA is applied.

As illustrated in FIG. 17 and FIG. 18, the number of CBGs of DL data in each slot or each cell is dynamically changed. Note that as the HARQ-ACK codebook size, 12 bits are set in FIG. 17 and 14 bits are set in FIG. 18. Also, as illustrated in FIG. 17 and FIG. 18, the base station 100 notifies the terminal 200 of a counter DAI, but not a total DAI.

For example, when TDD is applied as illustrated in FIG. 17, the terminal 200 normally receives DL assignment corresponding to the counter DAI=1, and receives DL data of 2 CBGs by following that DL assignment. Thus, the HARQ-ACK generation unit 208 of the terminal 200 sets ACK of 1 bit as a DL assignment ACK bit corresponding to the counter DAI=1, and sets ACK of 2 bits (here, ACK, ACK) as CBG ACK bits. As for the counter DAI=3, 4 illustrated in FIG. 17, HARQ-ACK is generated in a similar manner.

On the other hand, in FIG. 17, the terminal 200 has not received DL assignment corresponding to the counter DAI=2 due to a DCI decoding error. Here, at the time of reception of DL assignment corresponding to the counter DAI=3, the terminal 200 identifies that a DCI decoding error has occurred for DL assignment corresponding to the counter DAI=2. Then, the terminal 200 sets NACK of 1 bit as a DL assignment ACK bit corresponding to the counter DAI=2, and does not set CBG ACK corresponding to the counter DAI=2. That is, for DL assignment not received due to a DCI decoding error, the terminal 200 transmits HARQ-ACK of 1 bit (DL assignment ACK), irrespective of the number of CBGs assigned by that DL assignment.

Also in FIG. 17, the terminal 200 sets NACK to the remaining 2 bits not used for DL assignment ACK and CBG ACK.

Next, when CA is applied as illustrated in FIG. 18, the terminal 200 normally receives DL assignment in a cell 0 of a slot #0 corresponding to the counter DAI=1, and receives DL data of 2 CBGs by following that DL assignment. Thus, the HARQ-ACK generation unit 208 of the terminal 200 sets HARQ-ACK of 1 bit (ACK) as a DL assignment ACK bit corresponding to the counter DAI=1, and sets ACK of 2 bits (here, ACK, ACK) as a CBG ACK bit. As for the counter DAI=3, 4 illustrated in FIG. 18, HARQ-ACK is generated in a similar manner. That is, as illustrated in FIG. 18, for each of the counter DAI=1, 3, 4, DL assignment ACK and CBG ACK are sequentially generated.

On the other hand, for example, upon receiving the counter DAI=1, 3 illustrated in FIG. 18, the terminal 200 identifies that a DCI decoding error has occurred for DL assignment corresponding to the counter DAI=2. Thus, the HARQ-ACK generation unit 208 of the terminal 200 sets NACK of 1 bit as a DL assignment ACK bit corresponding to the counter DAI=2, and does not set CBG ACK corresponding to the counter DAI=2.

Also for DL assignment corresponding to the last counter DAI=5 illustrated in FIG. 18, a DCI decoding error has occurred at the terminal 200. Here, since a total DAI as in the generation method 3-1 is absent, the terminal 200 does not identify the presence or absence of DL assignment for the counter DAI=5. Thus, the terminal 200 sets NACK to the remaining bits (4 bits at the tail in FIG. 18) other than the bits assigned to HARQ-ACK (DL assignment ACK and CBG ACK) corresponding to the received (or identified) counter DAI=1 to 4 in the HARQ-ACK codebook size (14 bits in FIG. 18). This allows the terminal 200 to set NACK at a position where DL assignment ACK for the counter DAI=5 is originally assigned even if the terminal 200 does not identify the present or absence of DL assignment for the counter DAI=5.

With this, when a total DAI is absent, even if reception of the last DL assignment has failed, the terminal 200 can correctly notify the base station 100 of HARQ-ACK (NACK) for that DL assignment.

The HARQ-ACK determination unit 111 of the base station 100 determines a HARQ-ACK bit series transmitted from the terminal 200 by following a definition similar to that of the terminal 200. That is, in addition to HARQ-ACK for each CBG, the base station 100 detects the presence or absence of a DL assignment decoding error.

According to the generation method 3-2, a total DAI is not required, and thus DCI overhead can be reduced, compared with the generation method 3-1.

In the above, the HARQ-ACK generation methods according to the present embodiment have been described.

In this manner, in the present embodiment, the terminal 200 generates a HARQ-ACK bit series based on the DAI (counter DAI or total DAI) included in the plurality of pieces of DCI (DL assignment), notification of which is provided from the base station 100, and the plurality of TBs assigned by that DCI and each configured of at least one CBG.

This allows, for example, the terminal 200 to correctly notify the base station 100 of HARQ-ACK for each CBG even when the number of CBGs dynamically changes by DCI. For example, in the generation methods 1-1 to 1-3, even if a DCI decoding error has occurred, the terminal 200 can correctly identify the number of CBGs assigned by each DL assignment and transmit HARQ-ACK for each CBG. Also, in the generation methods 2-1 to 2-3 and the generation methods 3-1 and 3-2, even if a DCI decoding error has occurred, the terminal 200 can correctly notify the base station 100 of HARQ-ACK for each CBG or the presence or absence of a DCI decoding error.

From the above, according to the present embodiment, HARQ-ACK transmission (retransmission control) for each CBG can be appropriately performed even when the number of CBGs dynamically changes by DCI.

In the above, the embodiment of the present disclosure has been described.

Note that the above operation examples may be applied singly or a plurality of operation examples may be combined and applied.

For example, the generation method 2-1 and the generation method 1-2 may be combined. That is, even if the number of HARQ-ACK bits per DL assignment is fixed as in the generation method 2-1, notification of a total DAI may be abolished or a total DAI may be used for notification of another parameter as in the generation method 1-2. Note that while the counter DAI and the total DAI indicate a cumulative count and a total number of CBGs, respectively, in the generation method 1-2, when this is applied to the generation method 2-1, they indicate a cumulative count and a total number of DL assignments. Also, the HARQ-ACK codebook size may be semi-statically set by RRC signaling or the like, or may be dynamically set by DCI or the like. This allows the base station 100 to set the HARQ-ACK codebook size without using the total DAI. Also, DCI overhead can be reduced.

Also for example, the generation method 2-1 and the generation method 1-3 may be combined. That is, even if the number of HARQ-ACK bits per DL assignment is fixed as in the generation method 2-1, the total DAI may be allowed to be set larger than the number of actual CBGs as in the generation method 1-3. Note that while the counter DAI and the total DAI indicate a cumulative count and a total number of CBGs in the generation method 1-3, when this is applied to the generation method 2-1, they indicate a cumulative count and a total number of DL assignments. This allows the base station 100 to set the value of the total DAI even if the HARQ-ACK codebook size cannot correctly predicted in the initial slot.

Also for example, the generation method 1-1 and the generation method 3-1 or the generation method 3-2 may be combined. That is, even if the counter DAI and the total DAI indicate a cumulative count and a total number of CBGs as in the generation method 1-1, a DL assignment ACK bit may be added as in the generation method 3-1 or the generation method 3-2. This allows the base station 100 to clearly determine for which DL assignment a decoding error is present, and thus scheduling and so forth can be efficiently performed.

Also for example, the generation method 2-1 and the generation method 3-1 or the generation method 3-2 may be combined. That is, even if the number of HARQ-ACK bits per DL assignment is fixed as in the generation method 2-1, a DL assignment ACK bit may be added as in the generation method 3-1 or the generation method 3-2. This allows the base station 100 to clearly determine for which DL assignment a decoding error is present, and thus scheduling and so forth can be efficiently performed.

Also, the total DAI may include the number of HARQ-ACKs of the result of DL data reception by SPS.

Also, upper-layer signaling may be replaced by MAC signaling. In the case of MAC signaling, the frequency of notification to the terminal 200 can be increased, compared with RRC signaling.

The present disclosure can be realized by software, hardware, or software in cooperation with hardware. Each functional block used in the description of the embodiment described above can be partly or entirely realized by an LSI such as an integrated circuit, and each process described in the embodiment described above may be controlled partly or entirely by the same LSI or a combination of LSIs. The LSI may be individually formed as chips, or one chip may be formed so as to include a part or all of the functional blocks. The LSI may include data input and output. The LSI here may be referred to as an IC, a system LSI, a super LSI, or an ultra LSI depending on a difference in the degree of integration. The technique of implementing an integrated circuit is not limited to the LSI and may be realized by using a dedicated circuit, a general-purpose processor, or a special-purpose processor. Further, a FPGA (field programmable gate array) that can be programmed after the manufacture of the LSI or a reconfigurable processor in which the connections and the settings of circuit cells disposed inside the LSI can be reconfigured may be used. The present disclosure can be realized as digital processing or analogue processing. In addition, if integrated circuit technology replaces LSIs as a result of the advancement of semiconductor technology or other derivative technology, the functional blocks may be integrated using such technology. Biotechnology can also be applied.

A terminal of the present disclosure includes: a circuit which generates, based on a first parameter included in each of a plurality of downlink control signals, the first parameter indicating a cumulative count of code block groups configuring each of a plurality of transport blocks assigned by the plurality of downlink control signals, a response signal for each of the code block groups; and a transmitter which collectively transmits the response signals for each of the code block groups.

In the terminal of the present disclosure, each of the plurality of downlink control signals includes the first parameter, and does not include a second parameter indicating a setting value of a total number of the code block groups assigned by the plurality of downlink control signals.

In the terminal of the present disclosure, each of the plurality of downlink control signals includes the first parameter and a second parameter indicating a setting value of a total number of the code block groups assigned by the plurality of downlink control signals, and the setting value indicated in the second parameter is a value larger than the total number.

A terminal of the present disclosure includes: a circuit which generates, based on a first parameter included in each of a plurality of downlink control signals, the first parameter indicating a cumulative count of transmissions of the plurality of downlink control signals, a response signal for each of the code block groups configuring each of a plurality of transport blocks assigned by the plurality of downlink control signals; and a transmitter which collectively transmits the response signals for each of the code block groups. The number of bits of the response signals corresponding to the respective transport blocks assigned by one of the downlink control signals is a fixed value.

In the terminal of the present disclosure, the fixed value is a maximum number of the code block groups configuring the transport blocks.

In the terminal of the present disclosure, the fixed value is a value smaller than a maximum number of the code block groups configuring the transport blocks.

In the terminal of the present disclosure, the fixed value is one of a plurality of defined candidates.

In the terminal of the present disclosure, when the number of the code block groups assigned by the plurality of downlink control signals is larger than the fixed value, the circuit bundles the response signals for at least two code block groups of the code block groups.

In the terminal of the present disclosure, each of the plurality of downlink control signals includes the first parameter, and does not include a second parameter indicating a setting value of a total number of transmissions of the downlink control signals.

In the terminal of the present disclosure, each of the plurality of downlink control signals includes the first parameter and a second parameter indicating a setting value of a total number of transmissions of the downlink control signals, and the setting value indicated in the second parameter is a value larger than the total number.

A terminal of the present disclosure includes: a circuit which generates, based on a first parameter included in each of a plurality of downlink control signals, the first parameter indicating a cumulative count of transmissions of the plurality of downlink control signals, a first response signal for each of the plurality of downlink control signals and a second response signal for each of code block groups configuring each of the plurality of transport blocks assigned by the plurality of downlink control signals; and a transmitter which transmits the first response signal and the second response signal.

In the terminal of the present disclosure, the circuit generates the first response signal for each first parameter.

A communication method of the present disclosure includes: generating, based on a first parameter included in each of a plurality of downlink control signals, the first parameter indicating a cumulative count of code block groups configuring each of a plurality of transport blocks assigned by the plurality of downlink control signals, a response signal for each of the code block groups; and collectively transmitting the response signals for each of the code block groups.

A communication method of the present disclosure includes: generating, based on a first parameter included in each of a plurality of downlink control signals, the first parameter indicating a cumulative count of transmissions of the plurality of downlink control signals, a response signal for each of code block groups configuring each of a plurality of transport blocks assigned by the plurality of downlink control signals; and collectively transmitting the response signals for each of the code block groups. The number of bits of the response signals corresponding to the respective transport blocks assigned by one of the downlink control signal is a fixed value.

A communication method of the present disclosure includes: generating, based on a first parameter included in each of a plurality of downlink control signals, the first parameter indicating a cumulative count of transmissions of the plurality of downlink control signals, a first response signal for each of the plurality of downlink control signals and a second response signal for each of code block groups configuring each of the plurality of transport blocks assigned by the plurality of downlink control signals; and transmitting the first response signal and the second response signal.

One embodiment of the present disclosure is useful for mobile communication systems.

REFERENCE SIGNS LIST

100 base station
101 scheduling unit

102 DAI generation unit
103 DCI generation unit
104 DCI coding/modulation unit
105 data coding/modulation unit
106, 210 signal assignment unit
107, 211 transmission unit
108, 201 reception unit
109, 202 signal separation unit
110 UCI demodulation/decoding unit
111 HARQ-ACK determination unit
200 terminal
203 data demodulation/decoding unit
204 data error detection unit
205 DCI demodulation/decoding unit
206 DCI error detection unit
207 DAI determination unit
208 HARQ-ACK generation unit
209 coding/modulation unit

The invention claimed is:

1. A terminal comprising:
circuitry, which, in operation, generates, based on a first parameter included in each of a plurality of downlink control signals, the first parameter indicating a cumulative count of code block groups configuring each of a plurality of transport blocks assigned by the plurality of downlink control signals, a response signal for each of the code block groups; and
a transmitter, which, in operation, collectively transmits the response signals for each of the code block groups, wherein:
each of the plurality of downlink control signals includes the first parameter and a second parameter indicating a setting value of the code block groups assigned by the plurality of downlink control signals, and
a first number of bits used to represent the setting value is greater than a second number of bits used to represent a maximum number of the code block groups assigned by the plurality of downlink control signals.

2. The terminal according to claim 1, wherein the setting value is larger than a maximum value of the cumulative count of the code block groups.

3. A communication method comprising:
generating, based on a first parameter included in each of a plurality of downlink control signals, the first parameter indicating a cumulative count of code block groups configuring each of a plurality of transport blocks assigned by the plurality of downlink control signals, a response signal for each of the code block groups; and
collectively transmitting the response signals for each of the code block groups, wherein:
each of the plurality of downlink control signals includes the first parameter and a second parameter indicating a setting value of the code block groups assigned by the plurality of downlink control signals, and
a first number of bits used to represent the setting value is greater than a second number of bits used to represent a maximum number of the code block groups assigned by the plurality of downlink control signals.

4. The communication method according to claim 3, wherein the setting value is larger than a maximum value of the cumulative count of the code block groups.

* * * * *